(12) United States Patent
Hall et al.

(10) Patent No.: US 11,780,278 B2
(45) Date of Patent: Oct. 10, 2023

(54) SWAY CONTROLLING HITCH SYSTEM

(71) Applicant: Hall Logic, Inc., Provo, UT (US)

(72) Inventors: Michael R. Hall, Provo, UT (US);
David R. Hall, Provo, UT (US);
Thomas Corie, Springville, UT (US);
Dallin Clawson, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 161 days.

(21) Appl. No.: 17/334,672

(22) Filed: May 28, 2021

(65) Prior Publication Data

US 2021/0370732 A1    Dec. 2, 2021

Related U.S. Application Data

(60) Provisional application No. 63/031,497, filed on May 28, 2020, provisional application No. 63/031,543, filed on May 28, 2020.

(51) Int. Cl.
*B60D 1/30*    (2006.01)
*B60D 1/06*    (2006.01)
*B60D 1/167*    (2006.01)

(52) U.S. Cl.
CPC .............. *B60D 1/30* (2013.01); *B60D 1/065* (2013.01); *B60D 1/167* (2013.01)

(58) Field of Classification Search
CPC .......... B60D 1/30; B60D 1/065; B60D 1/167; B60D 1/345; B60D 1/247
See application file for complete search history.

(56) References Cited

U.S. PATENT DOCUMENTS 3,497,240 A * 2/1970 Doerfer .................... B60D 1/50
                                                                280/489
4,278,267 A * 7/1981 Vasseur ..................... B60T 7/20
                                                                188/112 A (Continued)

FOREIGN PATENT DOCUMENTS

WO        WO 8901419 A1 *  2/1989

*Primary Examiner* — Minnah L Seoh
*Assistant Examiner* — Ryan Edward Hardy

(57) ABSTRACT

A hitch system comprising a hitch shaft with a forward end configured to rigidly attach to a tow vehicle and a rearward end extending rearwardly toward a trailer frame; a head unit pivotally attached to the rearward end of the hitch shaft at a first pivot point having an upper portion and a lower portion, comprising a hitch ball on the upper portion of the head unit positioned out of vertical alignment with the first pivot point creating a second pivot point between the hitch ball and a trailer attached thereto; and a slot on the lower portion of the head unit, the slot having portions in vertical alignment with the first pivot point and the second pivot point; a first moment arm with a distal end configured for slidable attachment to a first bracket on the trailer frame and a forked proximal end comprising a first tine pivotally connected to the lower portion of the head unit; and a second tine having a knob in a sliding connection with the slot; and a second moment arm with a distal end configured for slidable attachment to a second bracket on the trailer frame and a proximal end pivotally attached to the head unit; wherein the first moment arm is at a first angle relative to the member of trailer and the second moment arm is at a second angle relative to the trailer; wherein the first angle is greater than the second angle; and whereby the effective pivot point of the system is moved forward to reduce sway is disclosed.

20 Claims, 30 Drawing Sheets

(56) References Cited

U.S. PATENT DOCUMENTS

| | | | | |
|---|---|---|---|---|
| 5,660,409 A | * | 8/1997 | Hensley | B60D 1/30 |
| | | | | 280/492 |
| 7,938,430 B1 | * | 5/2011 | Sahlem | B60D 1/30 |
| | | | | 280/455.1 |
| 8,328,222 B1 | * | 12/2012 | Roeber | B60D 1/247 |
| | | | | 280/406.1 |
| 11,247,518 B1 | * | 2/2022 | Works | B60D 1/247 |
| 2008/0143078 A1 | * | 6/2008 | McCoy | B60D 1/58 |
| | | | | 280/406.1 |
| 2009/0008905 A1 | * | 1/2009 | Bryce | B60D 1/32 |
| | | | | 280/498 |
| 2009/0033061 A1 | * | 2/2009 | Hensley | B60D 1/58 |
| | | | | 280/477 |
| 2014/0265240 A1 | * | 9/2014 | McCoy | B60D 1/06 |
| | | | | 280/405.1 |
| 2021/0094370 A1 | * | 4/2021 | McAllister | B60D 1/248 |

* cited by examiner

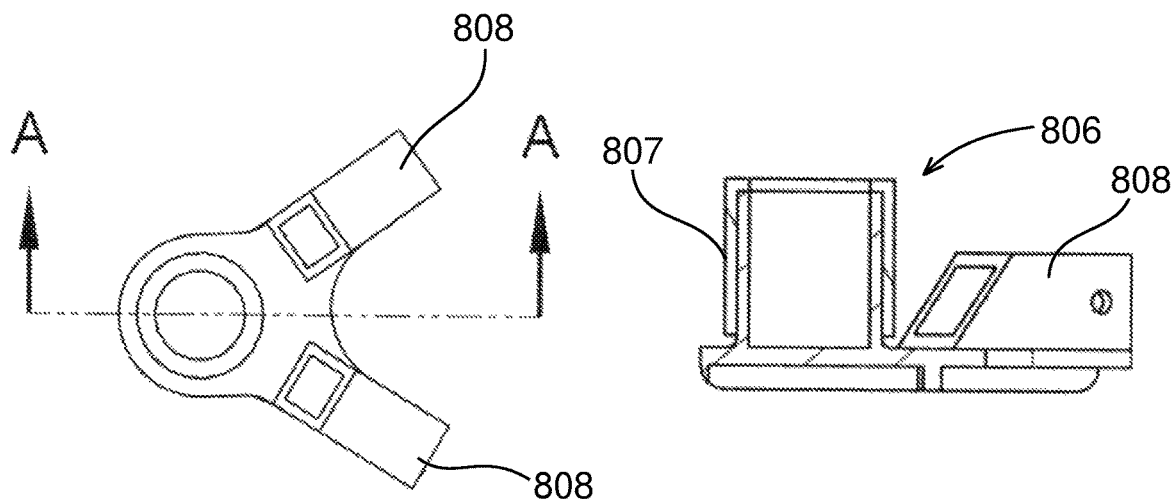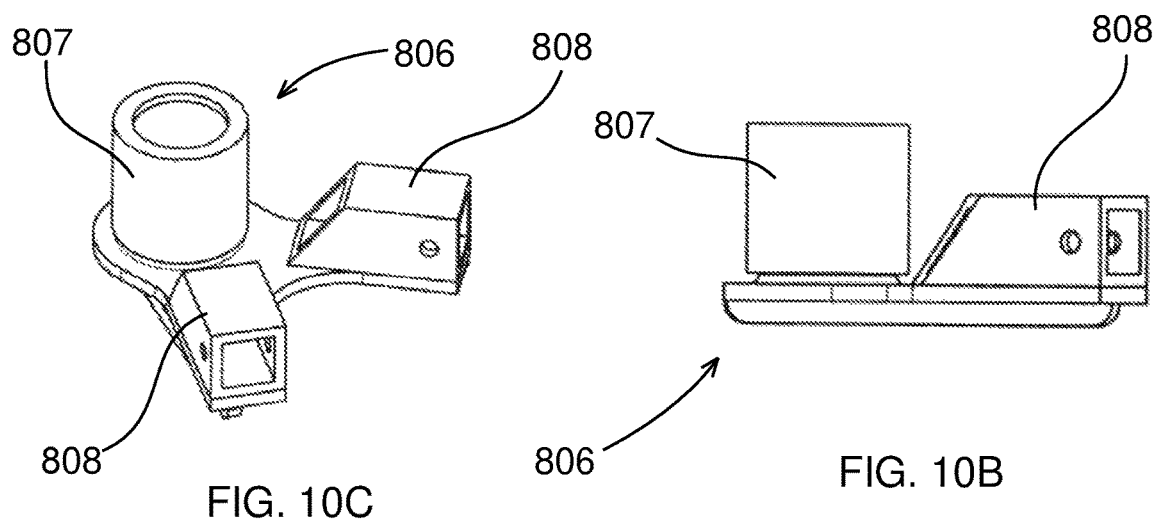

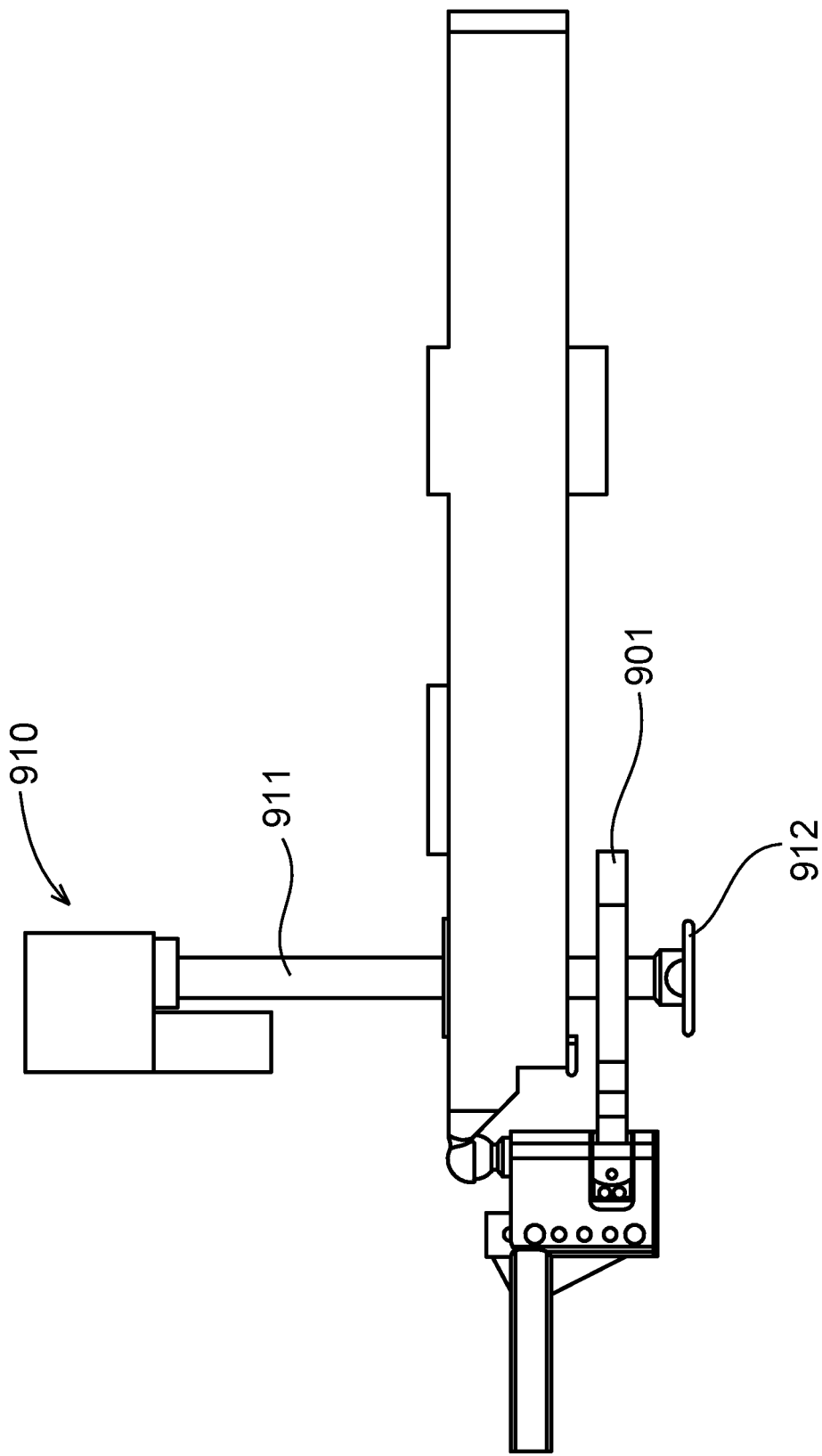

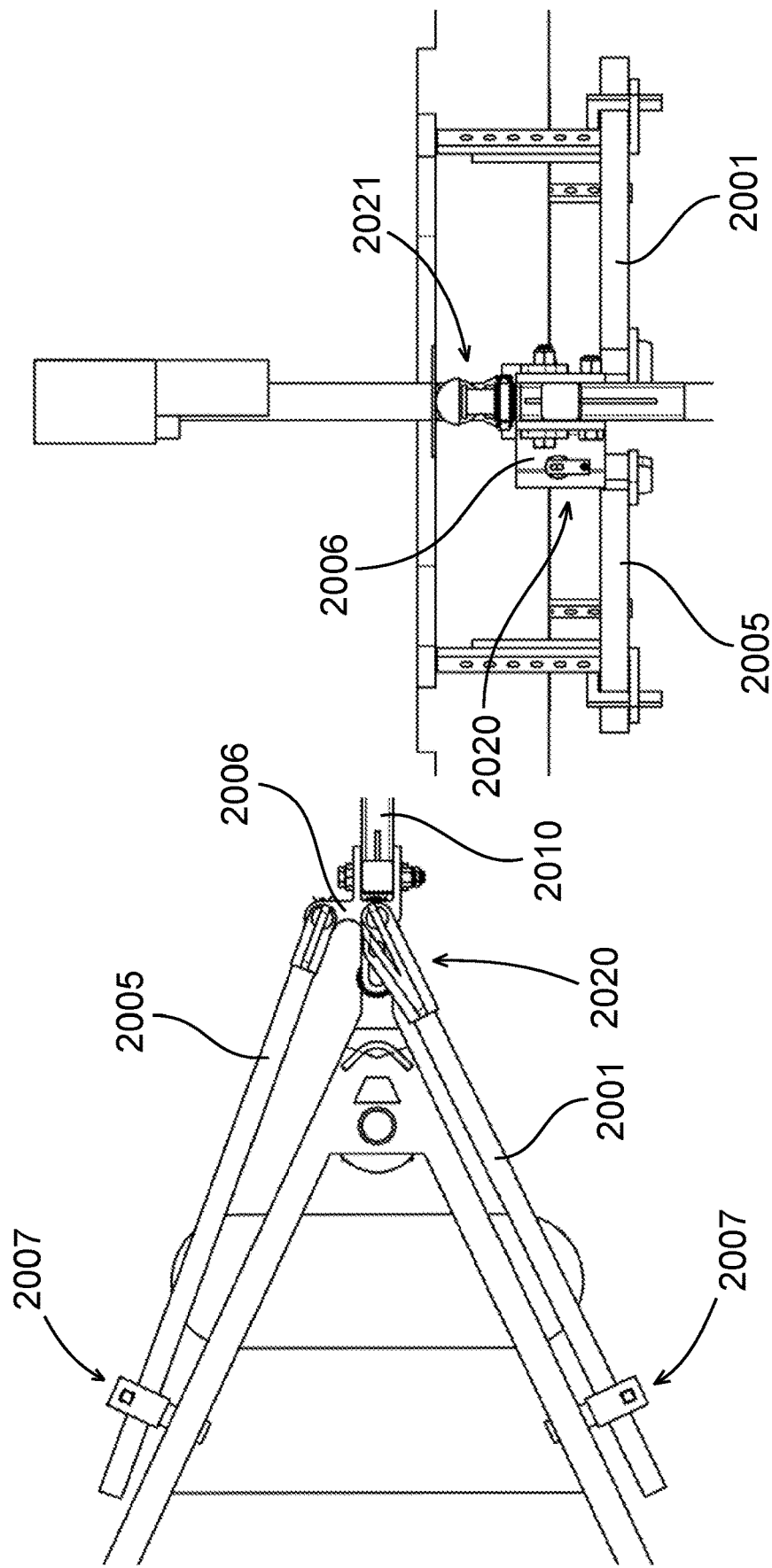

SWAY CONTROLLING HITCH SYSTEM

CROSS-REFERENCE TO RELATED APPLICATIONS

This application claims priority to U.S. Provisional Patent Application Nos. 63/031,497 titled "Weight Distribution Hitch System" filed on 28 May 2020 and 63/031,543 titled "Hitch System with Weight Distribution" filed on 28 May 2020, each of which is incorporated herein by reference in its entirety.

TECHNICAL FIELD

The present disclosure relates to trailer hitches. More particularly, it relates to trailer hitches equipped with sway control.

BACKGROUND

A typical trailer hitch connects to a vehicle near its rear bumper. When the trailer is connected, the downward load from the trailer tongue on the hitch can cause the vehicle to squat, putting extra load on the rear axle and lessening the load on the front axle. This can reduce the traction of the front tires and can cause the headlights to point upward. Equalizer hitches can prevent these problems by using spring bars to exert a moment on the vehicle, which shifts the resulting load of the trailer tongue toward the center of the vehicle, eliminating the squat. However, equalizer hitches require tedious setup and are not easily adjusted. Changes to the tow vehicle, the trailer, or the load carried by the trailer may require readjustment. These adjustments take time and may require special tools. Because of this, users may either fail to adjust or adjust incorrectly. Accordingly, a hitch that is easier to set up and adjust is desirable.

One hazard associated with towing heavy loads is sway, also known as fishtailing. Trailer sway occurs when lateral forces develop causing the trailer to move side to side. Sway is a major cause of accidents. An improved sway control hitch system that is effective and easy to setup and use is needed.

SUMMARY

In a first aspect, the disclosure provides a hitch system comprising a hitch shaft with a forward end configured to rigidly attach to a tow vehicle and a rearward end extending rearwardly toward a trailer frame; a head unit pivotally attached to the rearward end of the hitch shaft at a first pivot point having an upper portion and a lower portion, comprising a hitch ball on the upper portion of the head unit positioned out of vertical alignment with the first pivot point creating a second pivot point between the hitch ball and a trailer attached thereto; and a slot on the lower portion of the head unit, the slot having portions in vertical alignment with the first pivot point and the second pivot point; a first moment arm with a distal end configured for slidable attachment to a first bracket on the trailer frame and a forked proximal end comprising a first tine pivotally connected to the lower portion of the head unit; and a second tine having a knob in a sliding connection with the slot; and a second moment arm with a distal end configured for slidable attachment to a second bracket on the trailer frame and a proximal end pivotally attached to the head unit; wherein the first moment arm is at a first angle relative to the member of trailer and the second moment arm is at a second angle relative to the trailer; wherein the first angle is greater than the second angle; and whereby the effective pivot point of the system is moved forward to reduce sway.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 10 is a top view of an eighth exemplary embodiment of a weight distribution hitch system according to the present disclosure.

FIG. 10A is a cross-sectional view of the embodiment of FIG. 10 taken along the line A-A in FIG. 10.

FIG. 10B is a side view of the embodiment of FIG. 10.

FIG. 10C is a bottom view of the embodiment of FIG. 10.

FIG. 11 is a side view of a ninth exemplary embodiment of a weight distribution hitch system according to the present disclosure.

FIG. 24 is a bottom view of the embodiment of FIG. 23.

FIG. 25 is a front view of the embodiment of FIG. 23.

DETAILED DESCRIPTION

Figure 1:
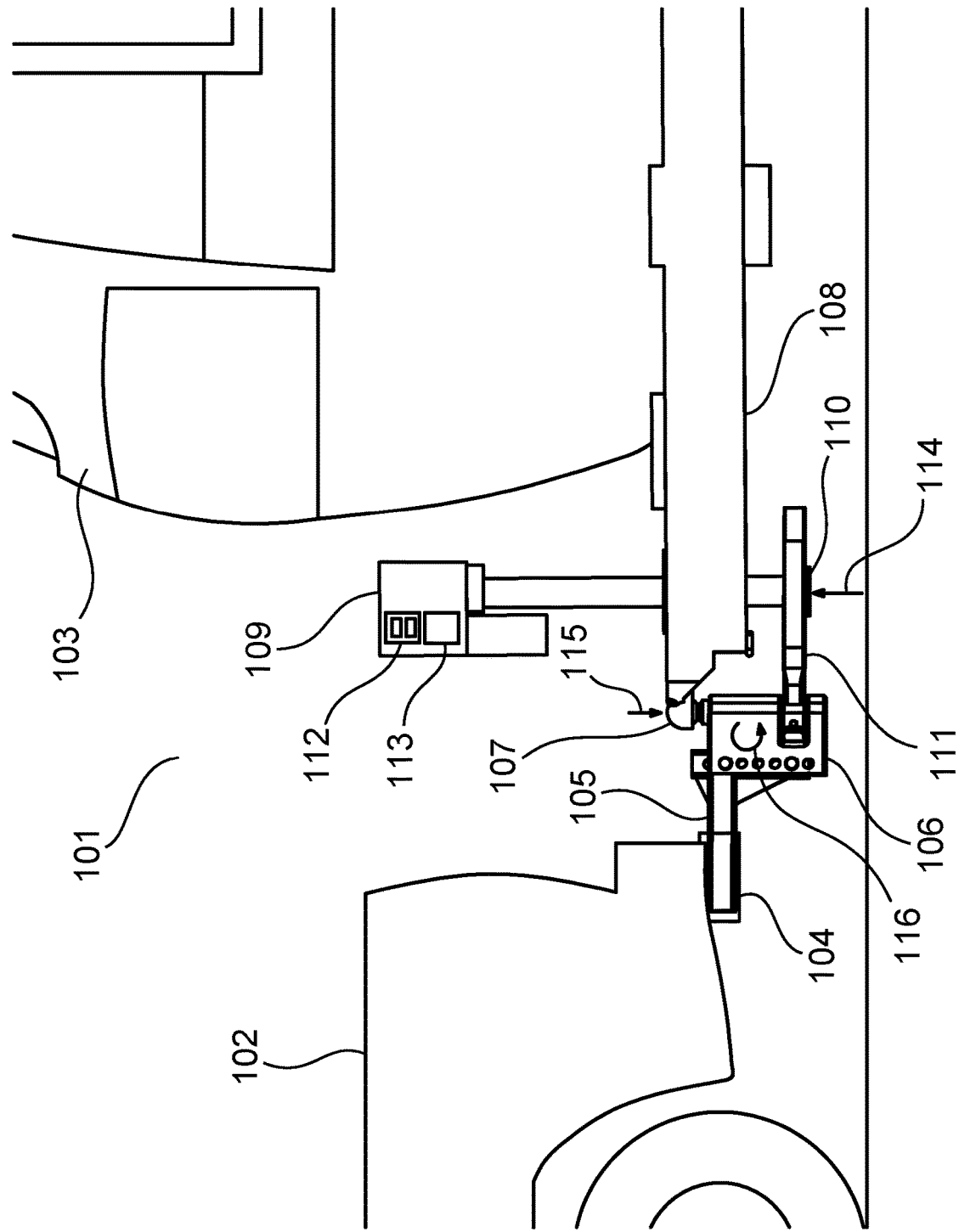
FIG. 1 is a side elevation view of a first exemplary embodiment of a weight distribution hitch system according to the present disclosure.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "hitch" is intended to have a broad meaning, referring to the hardware connecting a vehicle to a trailer including but not limited to a hitch receiver, a hitch shank, a hitch extension, a hitch head, a ball mount, a ball, and spring bars or moment bars, as context requires. It may also be used more specifically to refer to the piece that mounts underneath the vehicle, typically with bolts or welding, and contains the receiving hole for the hitch shank, as context requires.

As used herein, "forward" means toward the front of a vehicle, or the direction a vehicle travels when it is in drive and the steering wheel is in a neutral position. It also may refer to a portion of an object that faces that direction.

As used herein, "rearward" means the direction a car travels when it is in reverse and the steering wheel is in a neutral position. It also may refer to a portion of an object that faces that direction.

As used herein, "longitudinal axis" in the context of a vehicle/trailer system, is defined by a line extending from the front of a vehicle to the rear of the vehicle, through the centerline of the vehicle, and parallel to the ground. In the context of a single body, it may refer to the axis which goes through the center of the longest dimension of that body.

As used herein, "lateral axis" is orthogonal to the longitudinal axis and parallel to the ground.

As used herein, "vertical axis" is orthogonal to both the longitudinal axis and the lateral axis, or, in other words, straight up and down. Vertical axis may also apply to an axis which is not exactly straight up and down but is less than 15 degrees off.

As used herein, "centerplane" refers to a vertical plane on the centerline of a vehicle or trailer from front to back.

As used herein, "forward moment" means a twisting force that would tend to tilt the front of a vehicle down and the rear of the vehicle up.

As used herein, "attachment member" means the component of a weight distribution hitch on the vehicle side that mounts to the final connecting pieces which attach to the trailer, typically the ball mount or hitch head.

As used herein, "kinematic link" or "kinematic linkage" refers to a resistant body that constitutes part of the machine, connecting other parts which have motion relative to it, containing multiple joints connecting parts that move relative to each other.

As used herein, "effective pivot point" or "effective point of rotation" and similar phrases refer to a hypothetical fixed point of rotation that would achieve the same rotational effect as the kinematic linkage. The effective pivot point of a system may vary as the angle between the trailer and tow vehicle changes. The location of the effective pivot point is defined by its distance from the hitch ball.

EXEMPLARY EMBODIMENTS

The present disclosure relates to hitch systems. More particularly, it relates to sway control and weight distribution hitch systems that can be easier to attach and adjust, safer to operate, provide improved sway control, and/or dampen porpoising among other improvements.

Conventional trailer hitches typically consist of a ball/coupler arrangement, wherein a ball is attached to a tow vehicle, the coupler is attached to a trailer, and the ball fits inside the coupler to create a pivotal connection. This arrangement allows forces to be transferred between the vehicle and the trailer in the longitudinal, lateral, and vertical directions but does not allow any moments to be transferred. One problem with this arrangement is that the downward force from the coupler to the ball can overload the rear axle of the vehicle, causing it to squat. This takes weight off the front wheels, which can cause steering and/or braking issues and can also angle the headlights upward.

One way to prevent this is to use a weight distribution trailer hitch that can transfer a moment between the trailer and vehicle. A negative moment in the lateral direction, or a "forward moment," takes a load off the rear axle of the vehicle and distributes it to the front axle. This reduces the squat of the vehicle.

However, typical weight distribution hitches can be tedious to hook up and adjust. They involve many connections including multiple steps at each connection and even raising and lowering the trailer multiple times. Standard weight distribution hitches have two spring bars that extend from the back of the vehicle along the frame of the trailer. These bars are used to create a forward moment on the hitch that distributes the weight toward the vehicle's front tires. In order to do that, they are attached to the frame of the trailer under extreme stress, typically with chains. The length of the chains and/or the angle of the ball mount of the hitch must be adjusted so, when the trailer is connected, the correct moment is applied. To verify it is correct, measurements must be taken and compared to the system in an unloaded state. This is typically the distance between the front bumper and the ground. The adjustment step cannot be performed while the weight distribution hitch is connected, so everything must be disconnected each time an adjustment must be made in a tedious trial and error process. This can be fairly often if items are being added or removed from the trailer, the vehicle, or additional trailers in a double-tow scenario. Additionally, the user typically steps over the hitch many times during each setup, which can be hazardous.

The preferred embodiment of the disclosed system greatly reduces the complexity of the setup and adjustment process by reducing the number of parts, simplifying the connection process, allowing adjustments to be made without disconnecting any brackets or couplers, and by allowing a user to complete the setup on a single side of the hitch. Further, adjustments can be made without raising and lowering the trailer multiple times. Because there are no chains or chain brackets, there are fewer parts resulting in cost savings. Costs can be further reduced because many of the remaining parts can be smaller, such as the moment bar and the attachment member. The preferred embodiment can also improve safety by allowing the entire process to be completed on one side of the trailer.

The disclosed system is useful on many types of connections between a vehicle and a trailer where the trailer imposes a downward force on the rear of the vehicle, such as a ball and coupler hitch or a pintle hitch. In the preferred embodiment, a vehicle has a rear mounted hitch with a ball, and a trailer has a frame mounted coupler which latches onto the ball. In one embodiment, a hitch shank and/or a ball mount has holes in a vertical row allowing the ball to be adjustable relative to the ground. In other embodiments, the ball may be adjustable relative to the ground with other adjustable mechanisms, or it may be fixed. In one embodiment, pins or bolts may be used connect the ball mount to the hitch shank.

In a preferred embodiment, the moment bars extend from the attachment member rearward toward the trailer. In one embodiment, the moment bar is connected to the lower rear portion of the ball mount such that it may impose a moment on the vehicle about a lateral axis. The moment bar may be hingedly connected to the ball mount about a vertical axis so it can rotate side to side as the vehicle goes around corners.

In one embodiment, the hinged moment bar connection may also serve as sway control for the trailer. Rather than rotating freely, the hinged connection with the hitch ball may be resistive to being rotated, for example by promoting friction between the moment bar and the ball mount. Steel on steel is ideal in some applications of the invention because of its high coefficient of friction, but it comes with the drawback of corroding. Passive materials, which are less corrosive, such as brass, bronze, brake pad materials, and stainless steel, also may be used. Many of those materials, however, have less friction than steel. Some embodiments include replaceable wear plates, which allow a user to replace them if they become too worn.

The rearward ends of the moment bars are configured to receive an upward force. Because the forward end is fixed on a vertical axis, the upward force on the rearward end creates a moment on the attachment member. In one embodiment of the invention, the force is created by a lifting mechanism which is secured to the frame of the trailer.

One embodiment includes a weight distribution hitch that can prevent these problems by changing the weight distribution as the vehicle travels over uneven ground. In one embodiment, a load sensor indicates a change in load as the vehicle and the trailer are on uneven ground. The load sensor may communicate wirelessly with a control unit, such as a phone or built-in processor, which may communicate with the motor on the jack to adjust accordingly. When the trailer is going over a bump or hill, the load sensor will communicate a decreased tension on the jack to the control unit which will communicate to the motor to increase tension on the jack, which will help keep the vehicle pointed level, and vice versa. Then, when the vehicle returns to flat ground, the sensor will communicate an increased tension which will result in the control unit reducing the tension in the jack to normal, and vice versa.

Moment bars are typically connected to the hitch of a vehicle at a portion of the hitch located below the ball. This process may be time consuming and involve multiple connections. In some instances, moment bars are not removable from the hitch and remain attached to the vehicle as long as the hitch is attached. This makes the hitch very heavy, unsightly, and also creates a potential hazard for people walking near the rear end of the vehicle, particularly when the vehicle is not attached to the trailer, who may not see the moment bars protruding from the hitch. One embodiment creates an easy to connect and disconnect moment bar apparatus to alleviate these problems.

Now referring to FIG. 1, it shows a first embodiment using an electric jack as a lifting mechanism. A weight distribution system 101 couples a vehicle 102 to a trailer 103. The system comprises a hitch receiver 104 connected to the underside of the vehicle 102. Extending rearwardly from the hitch receiver 104 is a shank 105, a ball mount 106, and a ball which is partially hidden under the coupler of the trailer 107. The hitch receiver 104, shank 105, ball mount 106, and ball are all connected to the vehicle. On the trailer side of the system are a coupler 107, a frame 108, and a jack 109. The jack also contains a foot 110. A moment bar 111 may be a part of the truck side of the system or the trailer side of the system depending on user or manufacturer preference. The jack has at least two positions, an up position and a down position. While the foot is down, the jack supports the weight of the trailer and its shaft is in compression. While it is up, the foot abuts the underside of the moment bar 110 and the shaft is in tension between the moment bar 111 and the frame 108. The jack also has user controls 112, which typically includes a switch or buttons to move the jack between position one and position two, or to an intermediate position. That jack may be configured to weigh the load on the jack and display the load on a load indicator 113. It may also communicate the load to a controller, such as a phone.

As depicted in FIG. 1, when the system is in use to distribute the load forward on the vehicle, an upward force 114 increases the tongue weight 115 and imposes a moment 116 on the ball mount 106, which translates through the vehicle 102, adding a downward force to the front tires and an upward force to the rear tires, balancing the vehicle.

Figure 2:
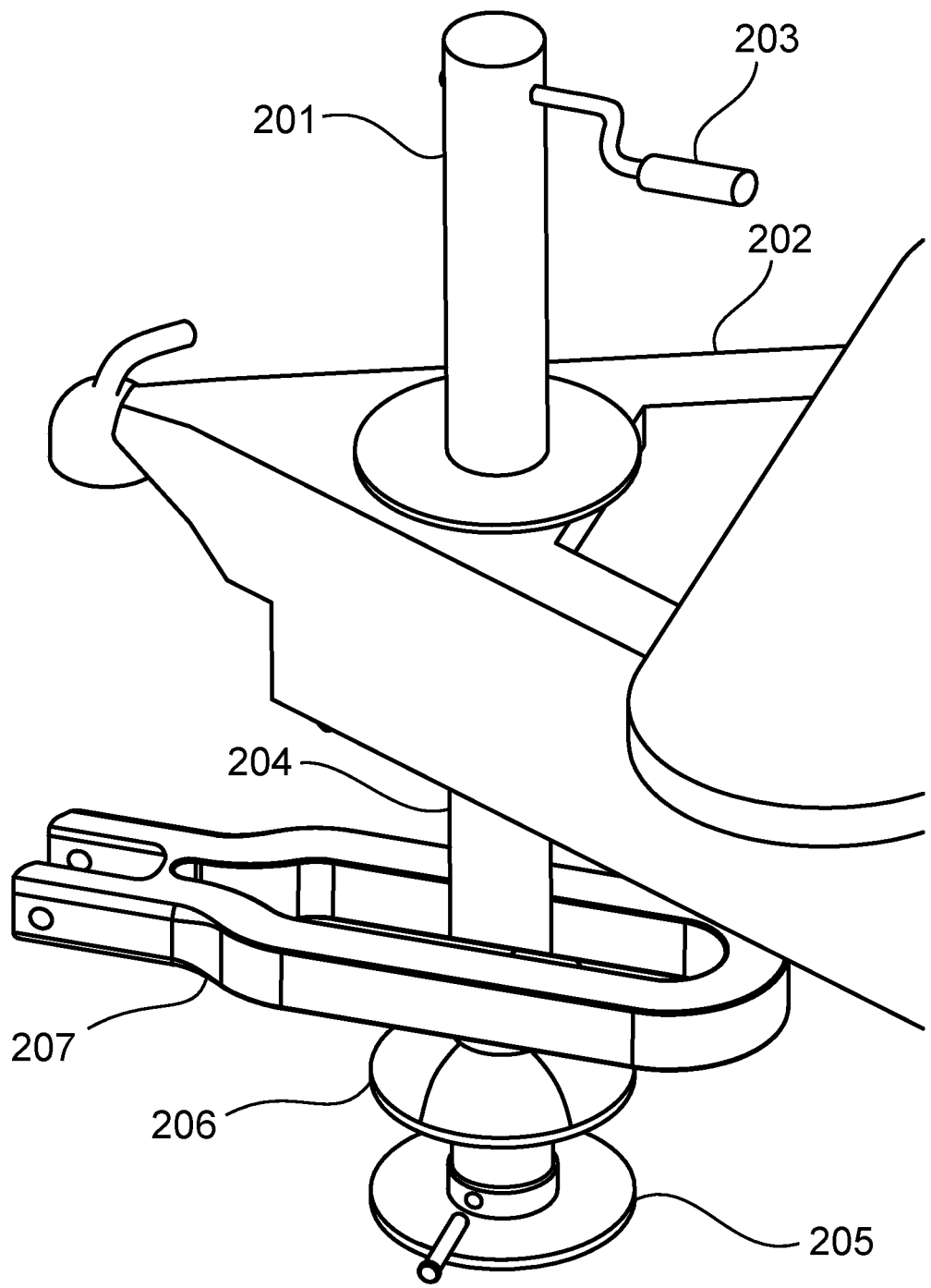
FIG. 2 is a perspective view of a second exemplary embodiment of a weight distribution system including a moment bar with an aperture according to the present disclosure.

Now referring to FIG. 2, which shows a second embodiment that includes a bearing plate on the jack. A jack 201 is mounted to the frame of a trailer 202. The jack includes a hand crank 203 to raise and lower the shaft 204. A foot 205 caps the bottom of the shaft 204 and gives a jack a stable bearing surface for the ground. A bearing plate 206 is attached to the shaft further up from the foot. In some embodiments, the bearing surface is flat, however, the depicted embodiment shows a convex surface. When the jack is in tension between the frame 202 and the moment bar 207, the convex shape of the bearing plate allows the abutting surfaces to roll slightly when the vehicle goes over bumps, rather than creating extreme point loads that an edge of a flat plate would create when the two surfaces are not parallel.

FIG. 2 also illustrates the way the moment bar 207 is locked onto the jack 201. In this configuration, the moment bar may be stored on the trailer with less risk of theft. This is also beneficial to users who would rather not have a moment bar or bars attached to their vehicles. However, other embodiments use moment bars that are easily removable from the jack, such as an open-ended bar that resembles a tuning fork.

Figure 3:
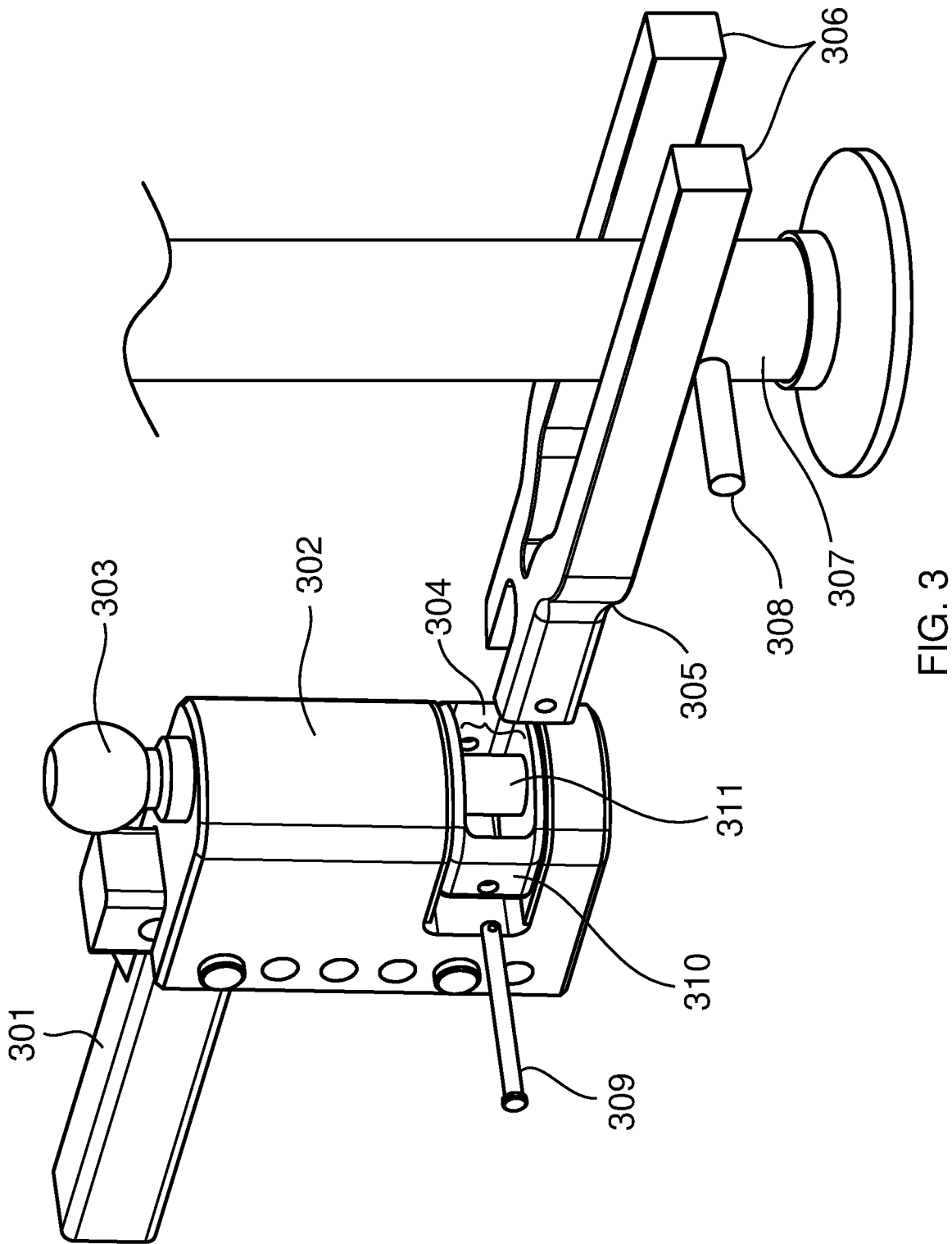
FIG. 3 is a perspective view of a third exemplary embodiment of a weight distribution hitch system according to the present disclosure.

Now referring to FIG. 3, which illustrates a third embodiment of the way the system may attach to a ball mount and an alternative configuration to abut the tension member. A hitch shank 301 is pinned to a ball mount 302 through a series of holes allowing the attachment to be adjustable. The upper end of the ball mount is attached to a ball 303 for coupling to a trailer, whereas the lower end of the ball mount includes a socket 304 designed to receive a moment bar 305. In this configuration, the socket 304 pivots about a central pin 311. In other configurations the socket does not rotate, but the moment bar rotates within the socket. The socket 304 includes an upper bearing surface and a lower bearing surface which translate the moment from the moment bar 305 to the ball mount 302. They also may provide friction to assist with sway control for the trailer. The upper bearing surface and lower bearing surface may be made of steel, for ease of manufacturing and cost, but they may also be made of other materials in order to provide different properties for the connection, such as rust prevention and friction. A pin 309 keeps the moment bar 305 from slipping out of the socket 304.

In the embodiment of FIG. 3, the moment bar 305 has two prongs 306 which abut a bearing surface on the jack 307. In the depicted embodiment, the bearing surface is provided by pegs 308 however, it may also be another shape such as the bearing plate of FIG. 2, D-rings, or other.

Figure 4:
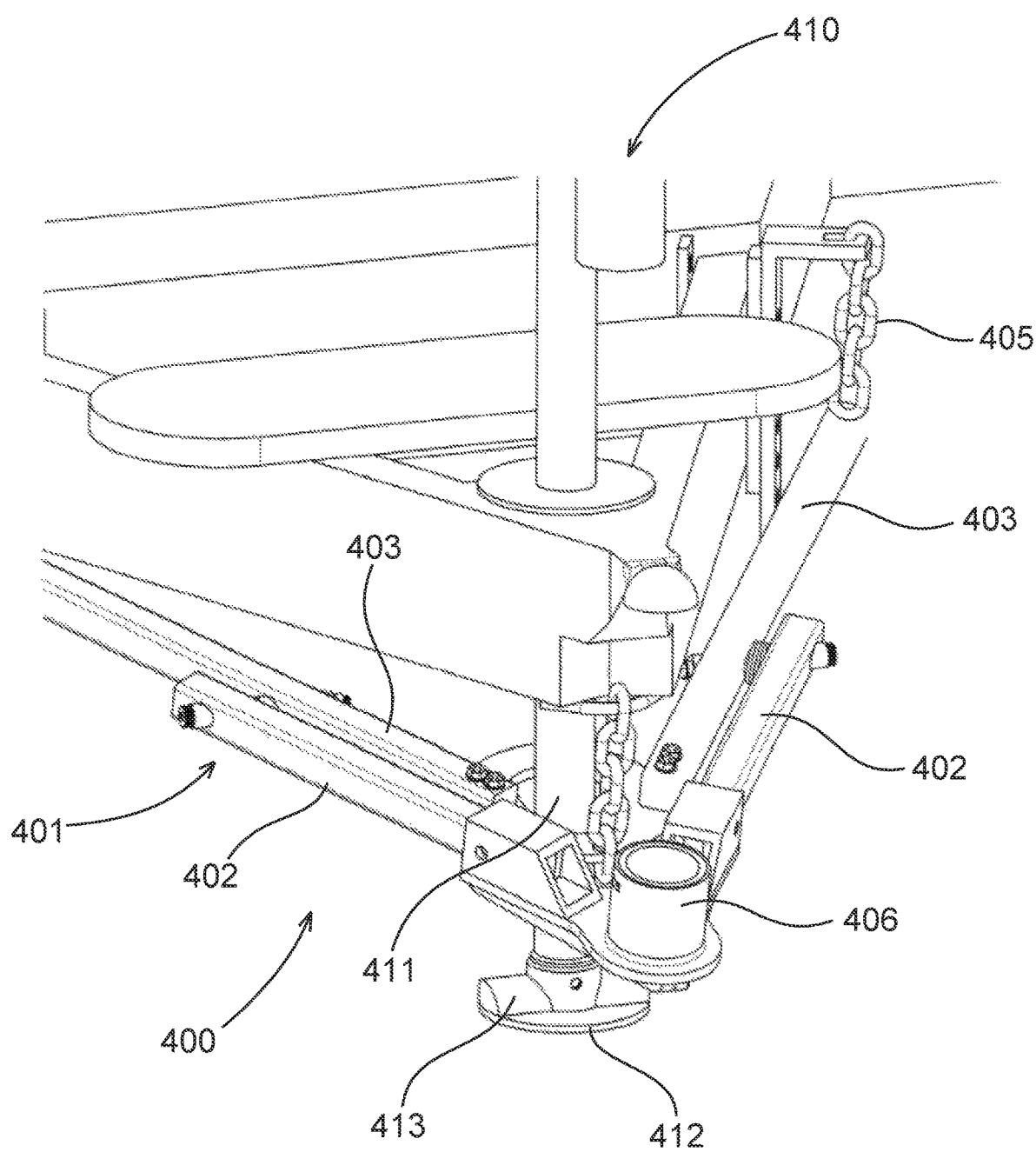
FIG. 4 is a perspective view of a fourth exemplary embodiment of a weight distribution hitch system according to the present disclosure.
Figure 5:
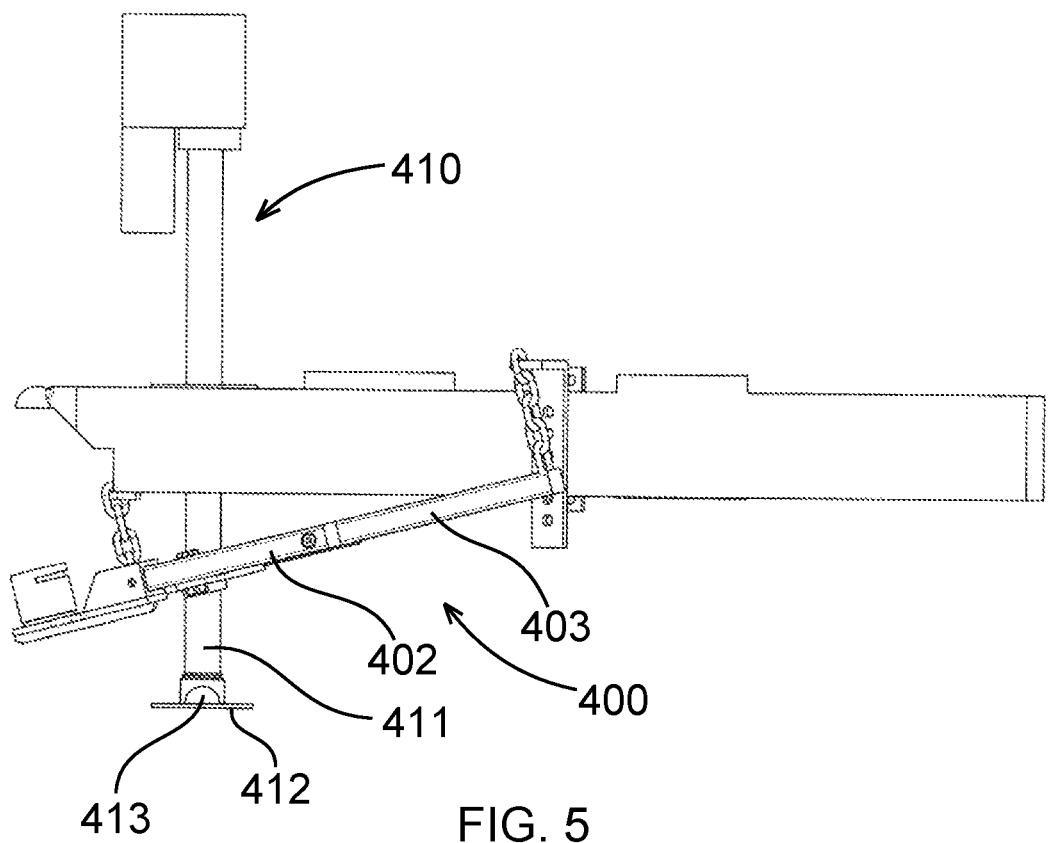
FIG. 5 is a side view of the fourth exemplary embodiment.
Figure 6:
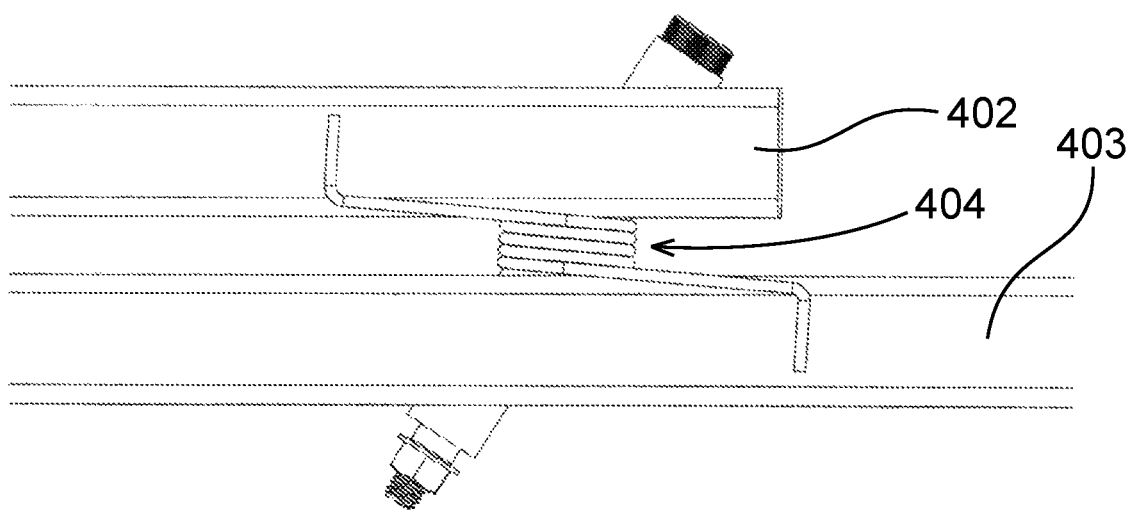
FIG. 6 is a bottom view of the fourth exemplary embodiment of a weight distribution hitch system according to the present disclosure.

Now referring to FIGS. 4 to 6, a fourth exemplary embodiment of a weight distribution hitch system 400 is shown. The system uses a two-part moment bar 401 with a first moment bar segment 402 that attaches to a coupling 406 that attaches to the vehicle hitch (not shown) and a second moment bar segment 403 that is attached to the trailer via bar chain 405. The first segment 402 and second segment 403 are connected by spring 404. Spring 404 applies a biasing force on the second moment bar segment 403 such that it applies an upward force on the coupling 406 and vehicle trailer hitch. The spring 404 also provides flexibility to the moment bar 401. In various exemplary embodiments, jack 410 applies force to the first segment 402 of the moment bar 401 via jack shaft 410 by raising jack foot 412. Cam 413 contacts first segment 402 to apply an upward force thereon.

Figure 7:
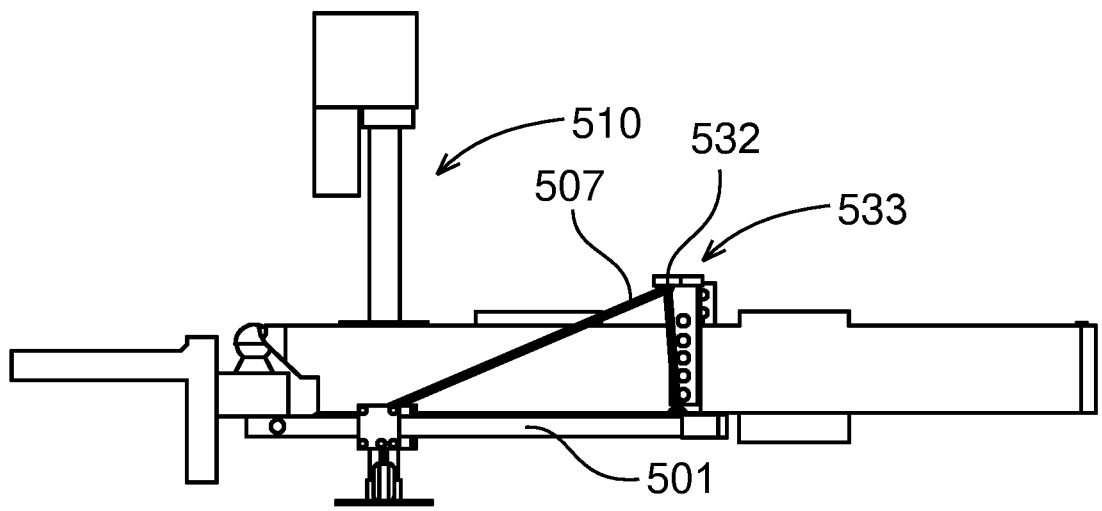
FIG. 7 is a side view of a fifth exemplary embodiment of a weight distribution hitch system according to the present disclosure.

Now referring to FIG. 7, a fifth exemplary embodiment of a weight distribution hitch system is illustrated. Moment bar 501 is used to apply a moment force on a vehicle via a trailer hitch 520. The force applied by moment bar 501 is adjusted using cable 507. In various exemplary embodiments, the cable 507 is routed through guides (see guides 631 in FIG. 8) along the center of the trailer frame and/or guides 532 attached to the sides of the trailer frame and is connected to the base of the jack 510. The force applied to the moment bar 501 by cables 507 is adjusted by raising and lowering jack 510. The guides 532 may be part of brackets 533 attached to the trailer.

Figure 8:
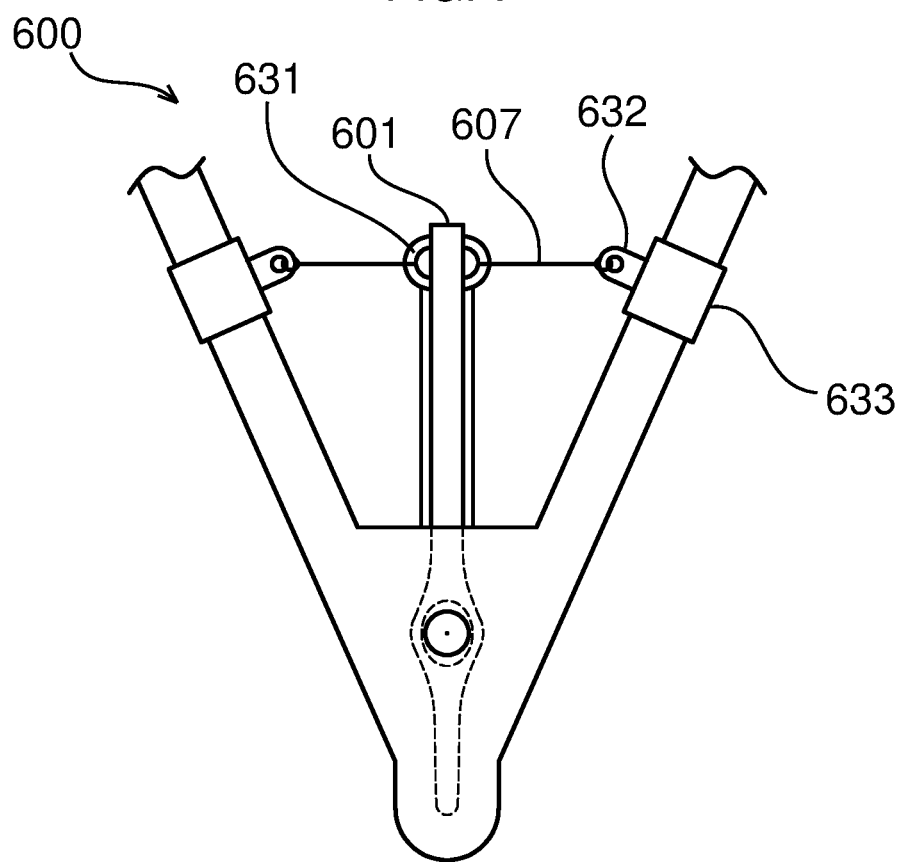
FIG. 8 a top view of a sixth exemplary embodiment of a weight distribution hitch system according to the present disclosure.

Now referring to FIG. 8, a fifth exemplary embodiments, respectively of a weight distribution hitch system 600 is illustrated. Moment bar 601 is used to apply a moment force on a vehicle via a trailer hitch (not shown). The force applied by moment bar 601 is adjusted using cable 607. In various exemplary embodiments, the cable 607 is routed through guides 631 along the center of the trailer frame and/or guides 632 attached to the sides of the trailer frame. The guides 632 may be part of brackets 633 attached to the trailer.

Figure 9A:
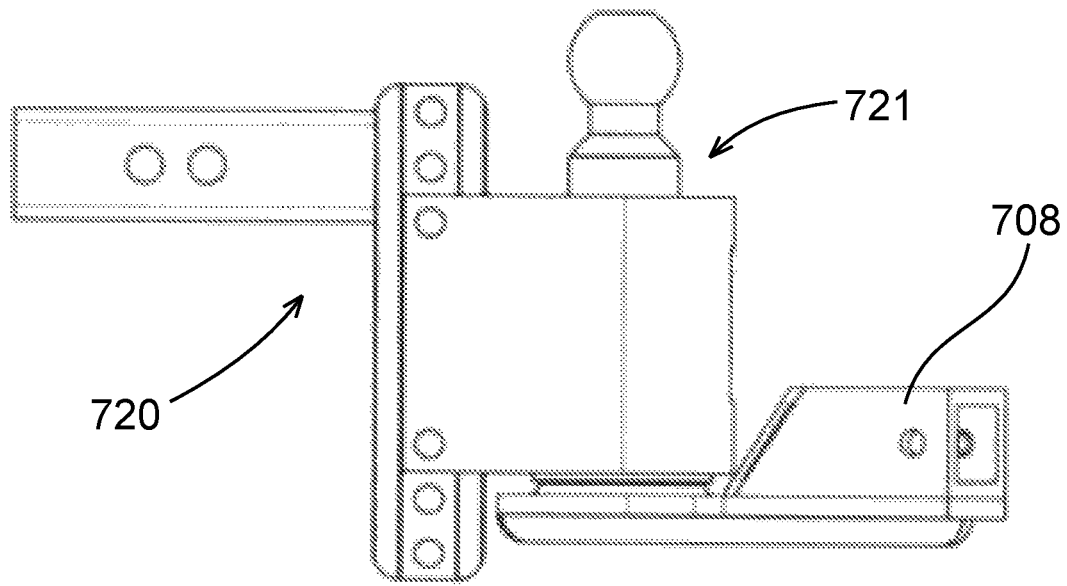
FIG. 9A is a side view of a seventh exemplary embodiment of a weight distribution hitch system according to the present disclosure.
Figure 9B:
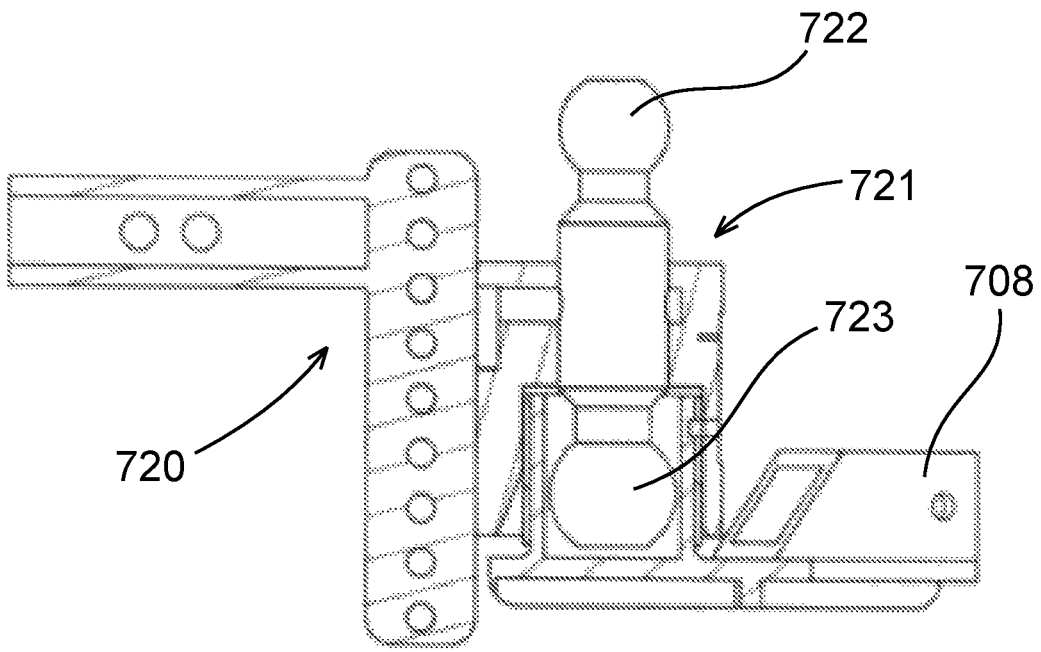
FIG. 9B is a side cross-sectional view of the embodiment of FIG. 9A.
Figure 9C:
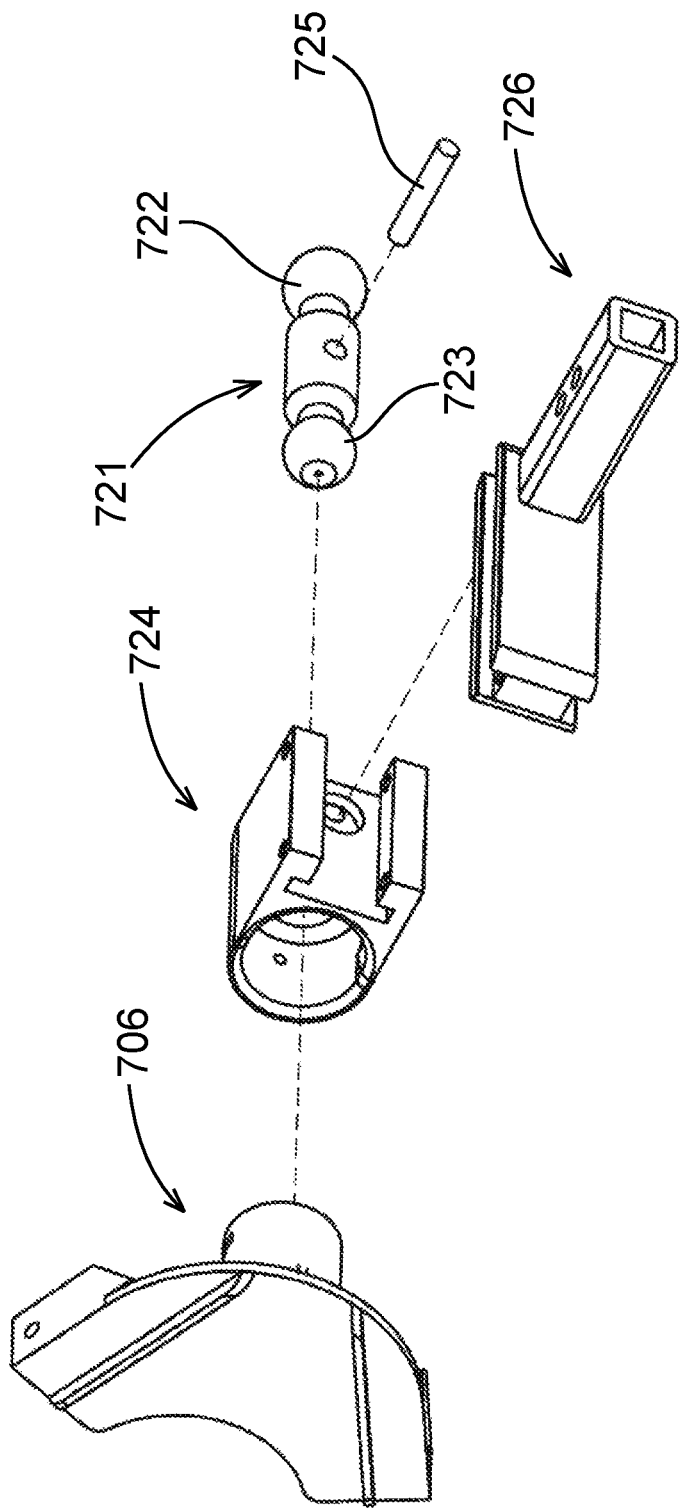
FIG. 9C is an exploded view of embodiment of FIG. 9A.

Now referring to FIGS. 9A to 9C, a seventh exemplary embodiment of a trailer hitch 720, with two interchangeable hitch balls 722 and 723. Different trailers may use different size hitches. Hitch 720 includes reversible hitch insert 721 with two different size balls 722 and 723. The hitch insert 721 may be removed from the hitch and its orientation reversed to select which hitch ball 722 or 723 is available for use. In a preferred embodiment, the hitch ball 722 or 723 not in position for use in concealed within cylindrical barrel 724 to which the moment bar(s) (not shown) may be attached, typically via a hitch coupling 706 that mates with the barrel 724.

Now referring to FIG. 9C, an exploded view of a trailer hitch 720 with dual hitch balls 722 and 723 is provided. The hitch 720 may be detached from the shank 726 reversible balls 721 removed to change which is in position for use. In an exemplary embodiment a pin 725 or other connector is used to secure the hitch ball mount 722 to the hitch 720.

Now referring to FIGS. 10 to 10C, an eighth exemplary embodiment of a hitch coupling 806 is illustrated. Moment bars (not shown) connect to the coupling via brackets 808 and, in an exemplary embodiment, are secured thereto with a pin (not shown). The coupling 806 also includes a barrel 807 that attaches to the hitch (not shown) on the vehicle.

Now referring to FIGS. 11, a ninth embodiment of a weight distribution hitch system that uses the trailer jack to apply the moment force is shown. The jack 910 includes a shaft 911 with a bearing plate 912 near its foot. When the jack 910 is raised, the shaft 911 is retracted and the bearing plate 912 contacts the moment bar applying a force through the bearing plate 912 on moment bar 901.

Figure 12:
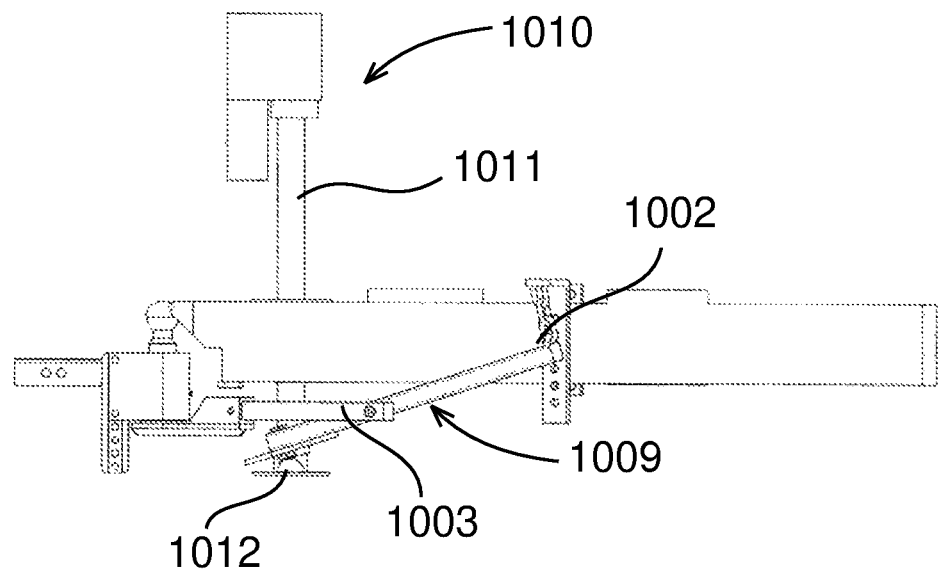
FIG. 12 is a side view of a tenth exemplary embodiment of a weight distribution hitch system according to the present disclosure.
Figure 13:
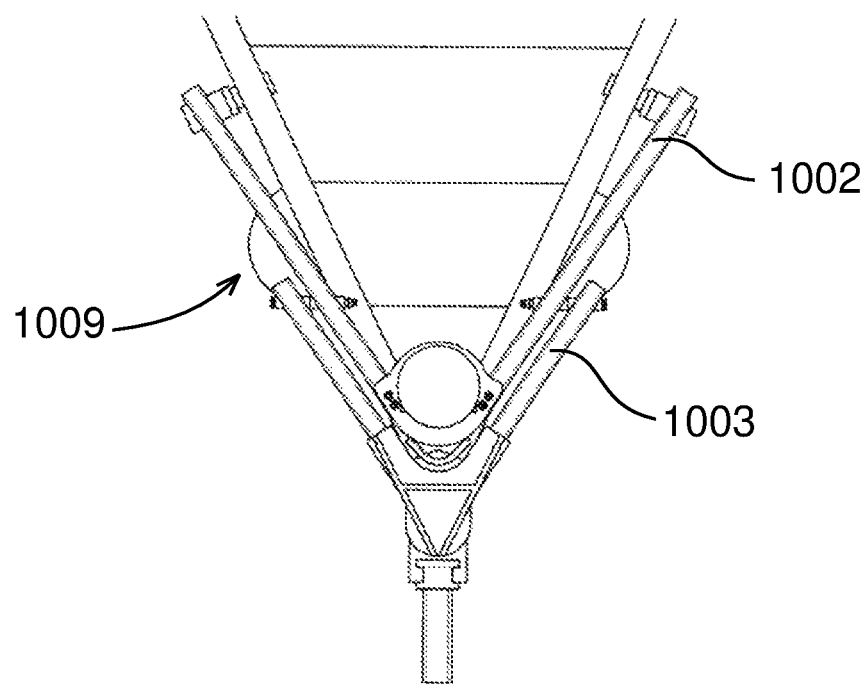
FIG. 13 is a top view of the embodiment of FIG. 12.
Figure 14:
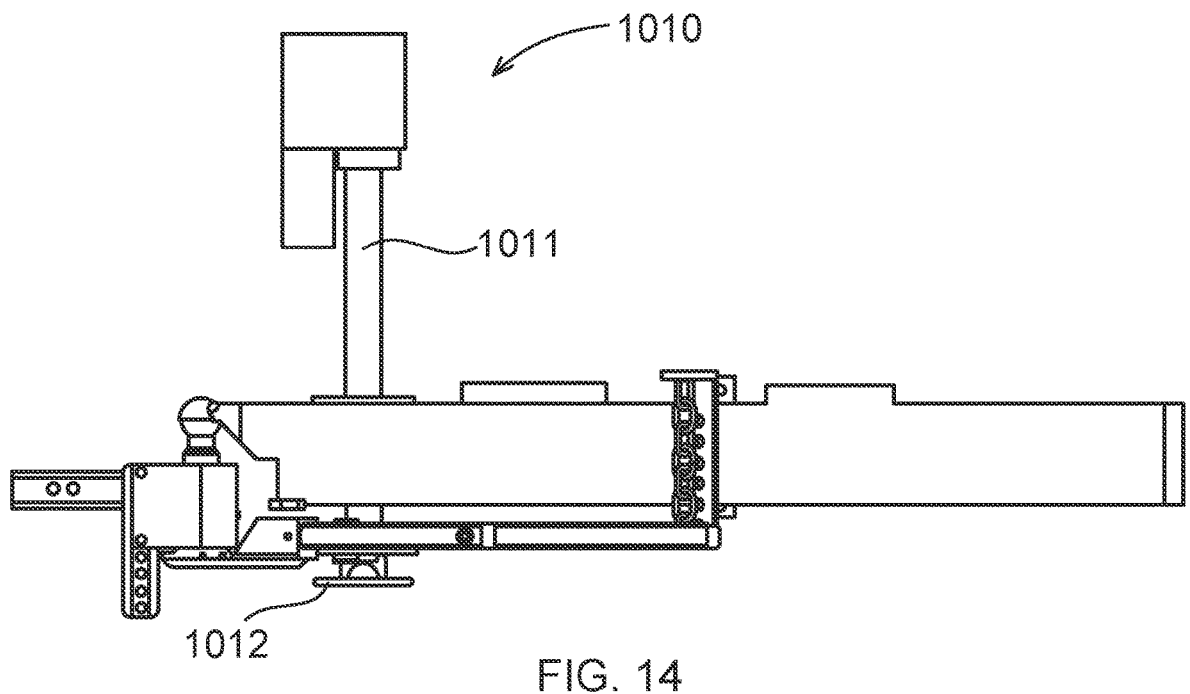
FIG. 14 is a side view of the embodiment of FIG. 12 with the weight distribution adjusted.
Figure 15:
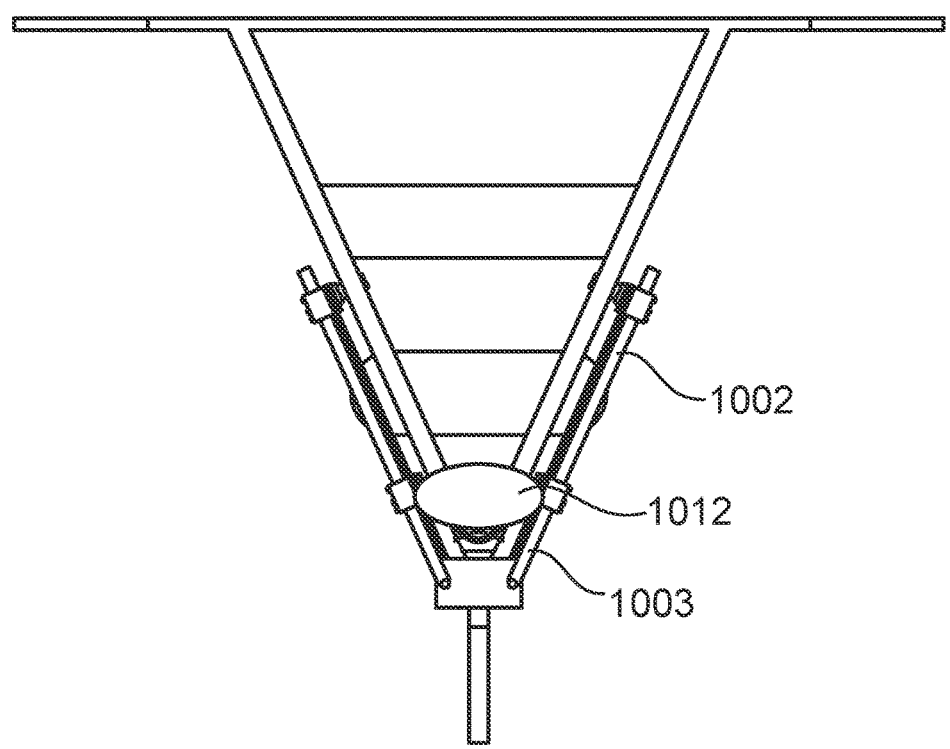
FIG. 15 is a bottom view of the embodiment of FIG. 12.

Now referring to FIGS. 12 to 15, a tenth exemplary embodiment of a weight distribution hitch system using the jack to apply the moment force. The jack shaft 1011 has a cam 1012 near the foot that contacts a first moment bar 1002 applying an upward force on the second moment bar 1003. The first and second moment bars are pivotally connected. In this embodiment, the two-part moment bar 1009 (i.e., first moment bar 1002 and second moment bar 1003) is attached to the trailer frame by a chain 1005. Referring specifically to FIG. 13, the positions of the first moment bar 1002 and second moment bar 1003 are better illustrated. The changed positions of the moment bars 1002 and 1003 with the jack lowered and raised are illustrated by FIGS. 12 and 14, respectively.

Figure 16:
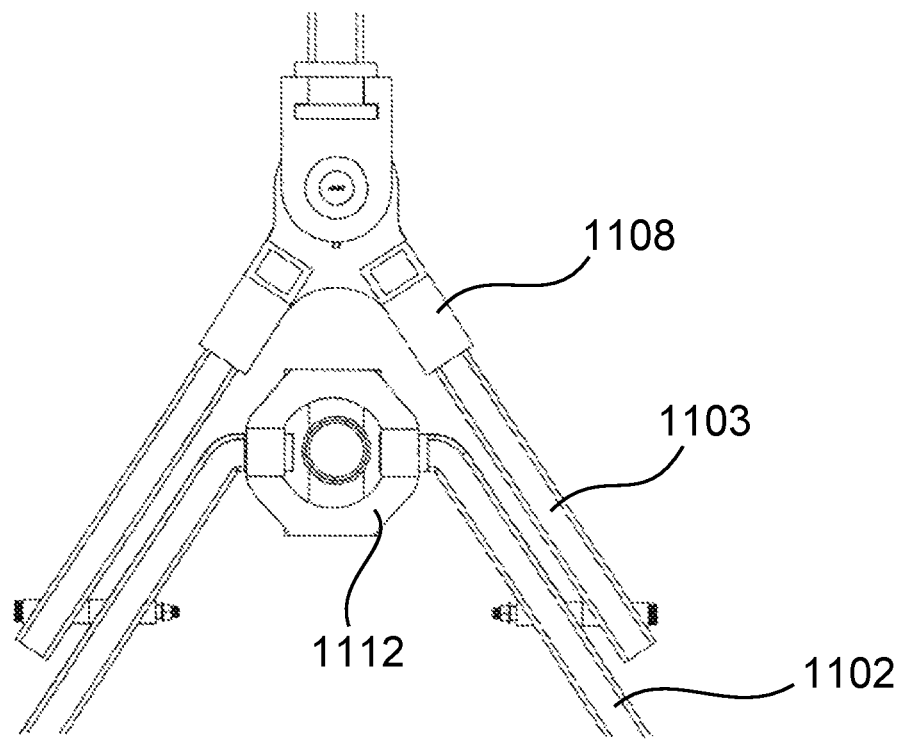
FIG. 16 is a top view of an eleventh exemplary embodiment of a weight distribution system according to the present disclosure.
Figure 17:
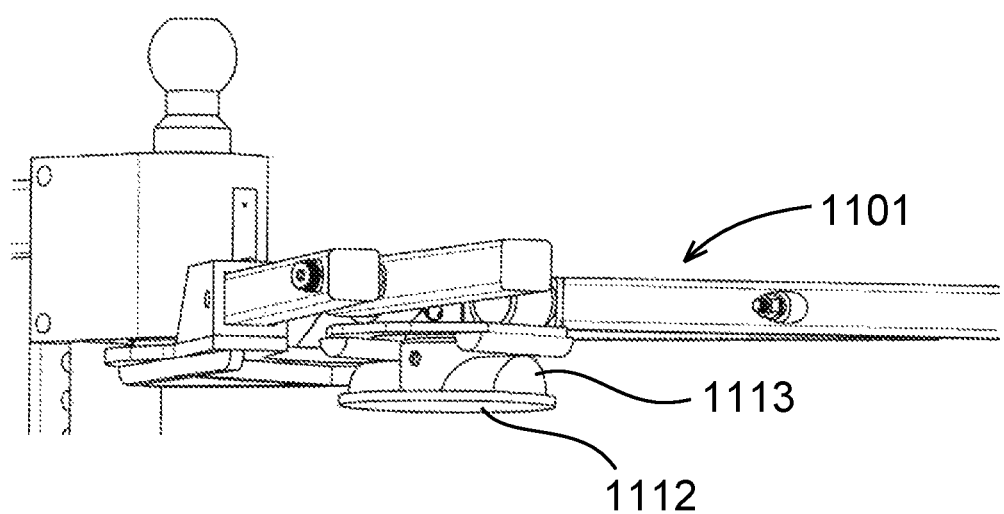
FIG. 17 is an isometric side view of the embodiment of FIG. 16.

Now referring to FIGS. 16 and 17, an eleventh exemplary embodiment, which is an alternative to the embodiment of FIGS. 12 to 15, is shown. The bearing plate 1112 comprises rounded cam 1113 that maintains consistent contact with the two-part moment bars 1101 comprising first moment bar segment 1102 and second moment bar segment 1103, as the vehicle and trailer traverse rises and drops in the road without transferring the load to a front or back edge as would occur with direct contact on the bearing plate 1112 or using a more rectangular cam. Moment bar 1101 attaches to the vehicle hitch via coupling 1108.

Figure 18:
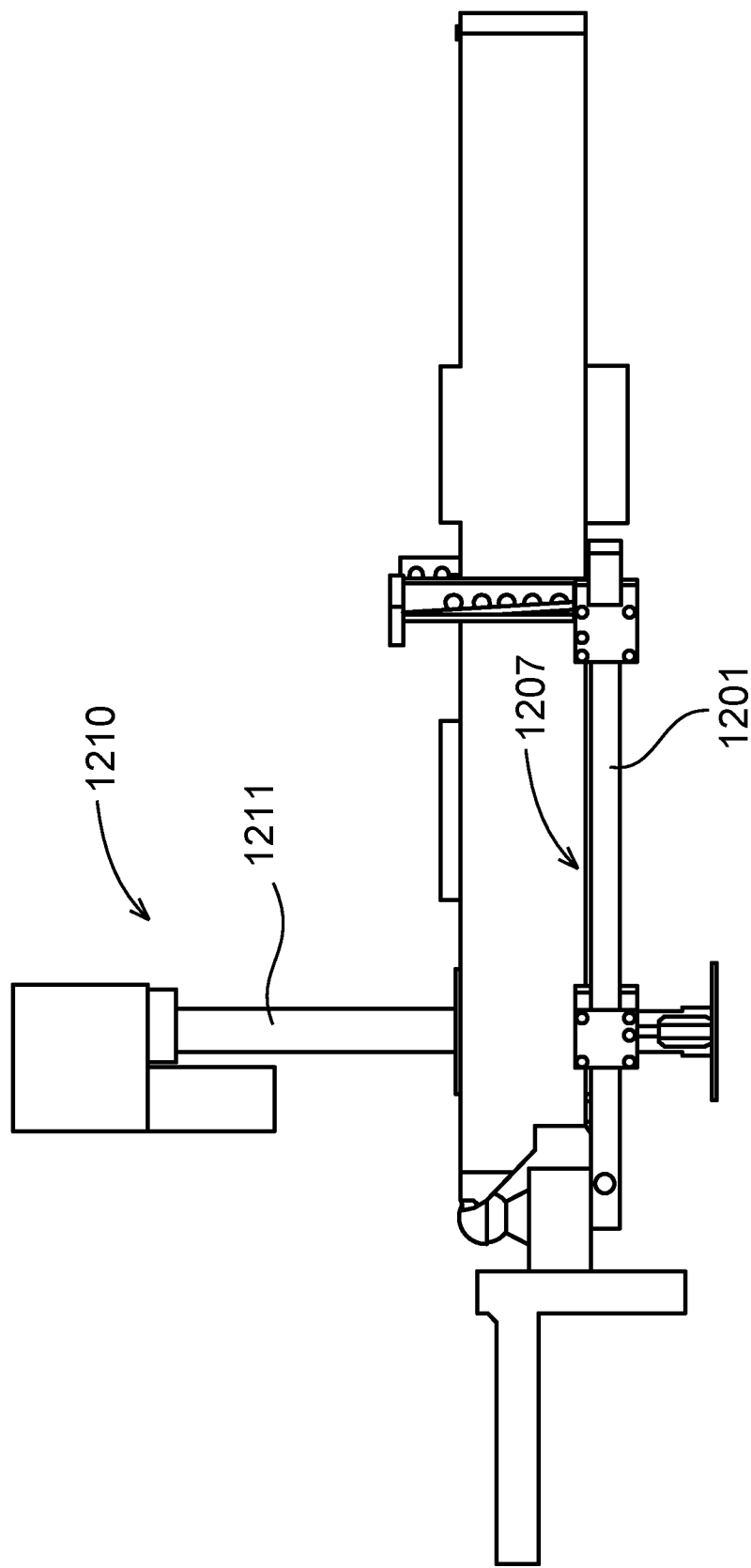
FIG. 18 is a side view of a twelfth exemplary embodiment of a weight distribution hitch system according to the present disclosure.

Now referring to FIG. 18, a twelfth exemplary embodiment of a weight distribution hitch system using the jack in compression to apply the moment force is shown. In various exemplary embodiments, the jack 1210 is raised and then connected to the system. In some embodiments, as the jack shaft 1211 is lowered a cable 1207 or similar connector is pulled down with it. The cable is also attached to the moment bar 1201 in such a way (e.g., pulleys) such that it applies an upward moment force on the moment bar 1201.

Figure 19:
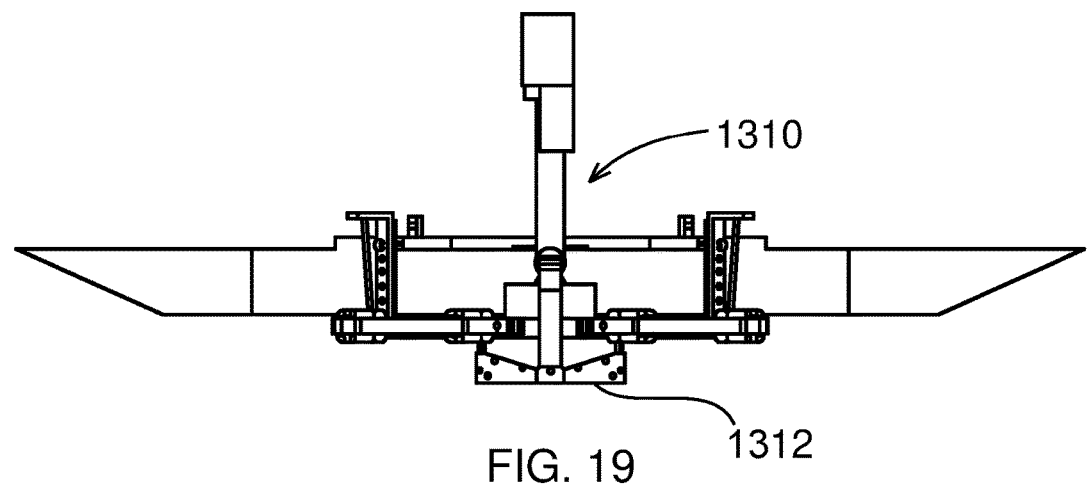
FIG. 19 is a front view of a thirteenth exemplary embodiment of a weight distribution hitch system according to the present disclosure.
Figures 20, 20A:
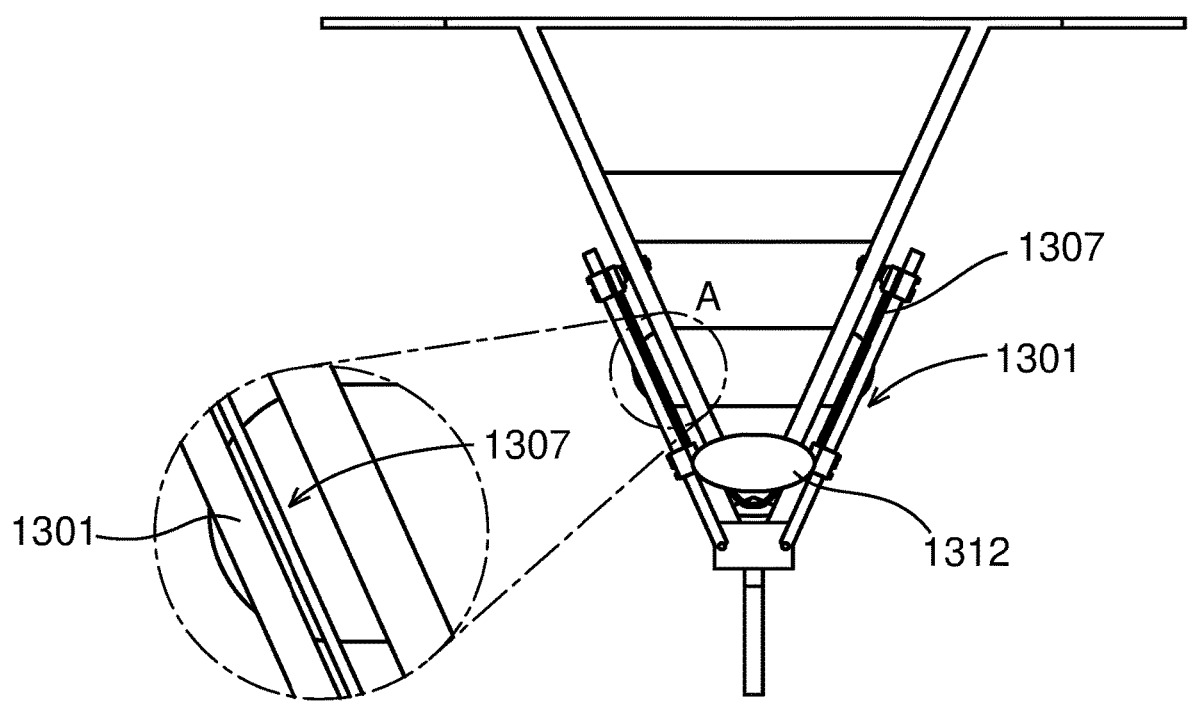
FIG. 20 is s bottom view of the embodiment of FIG. 19.
FIG. 20A is close-up view of the moment arm and cable in the embodiment of FIG. 20.

Now referring to FIGS. 19 and 20, a thirteenth exemplary embodiment using the jack 1310 in compression rather than tension is shown. In this embodiment, a cable 1307 (e.g., a steel braided cable) is attached to the jack foot 1312 and routed to the moment bars 1301. In a preferred embodiment, the cable 1307 is routed between the frame and the moment bar 1301 as shown in FIG. 20.

Figure 21:
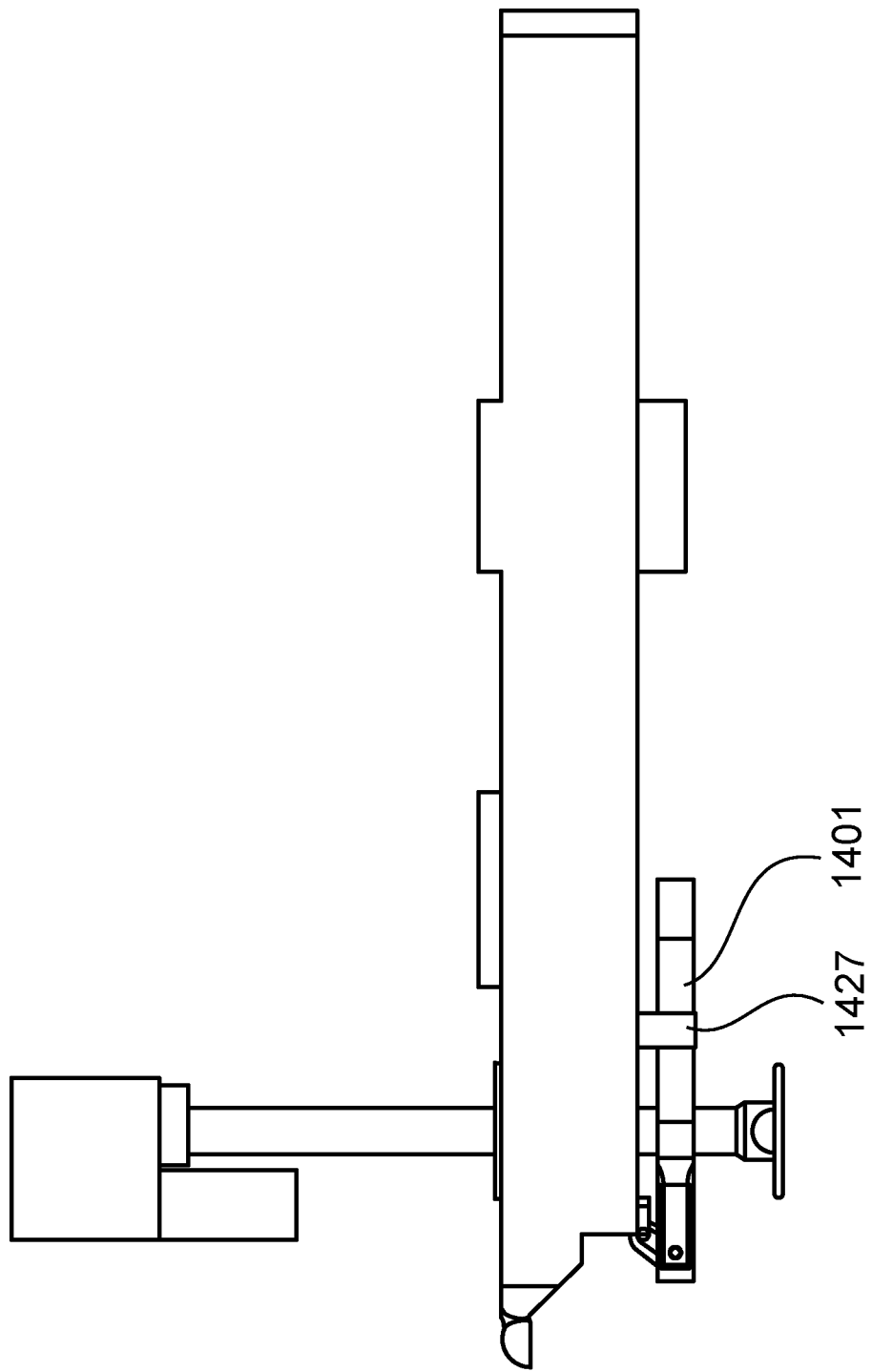
FIG. 21 is a side view of a fourteenth exemplary embodiment of a weight distribution hitch system according to the present disclosure.
Figure 22:
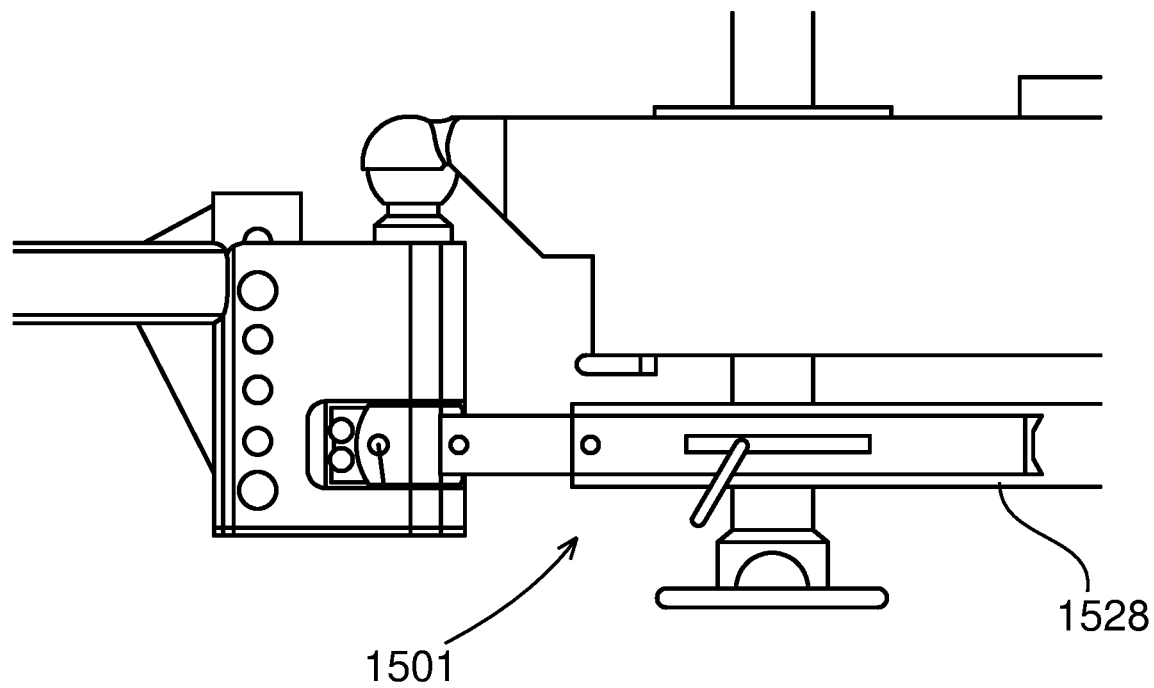
FIG. 22 is a side view of a fifteenth exemplary embodiment of a weight distribution hitch system according to the present disclosure.
Figure 23:
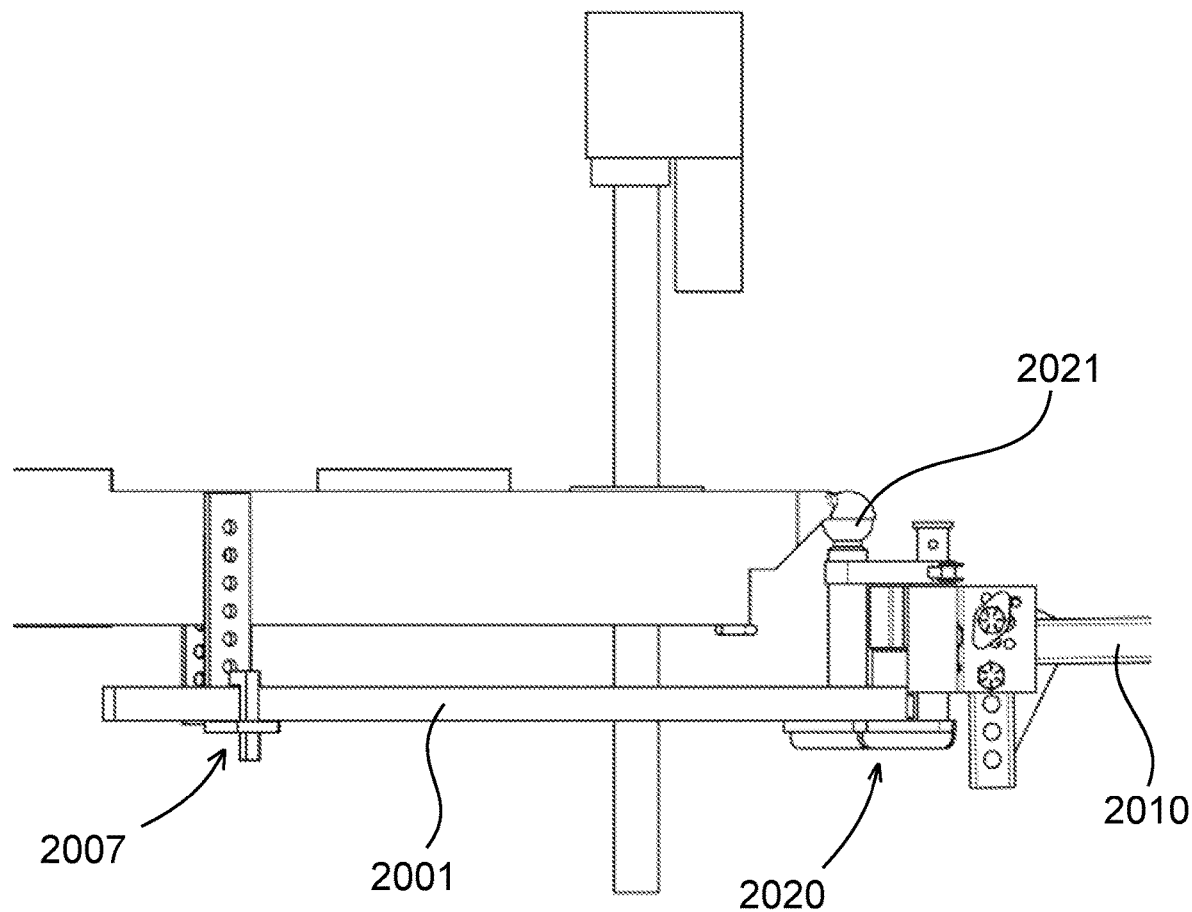
FIG. 23 is a side view of a first exemplary embodiment of a weight distribution hitch system with kinematic sway control according to the present disclosure.
Figure 26:
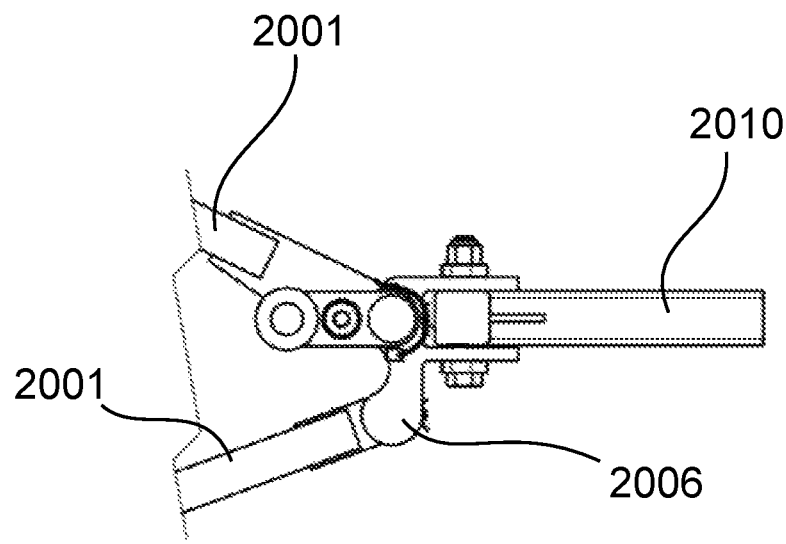
FIG. 26 is a top view of a portion of the embodiment of FIG. 23.
Figure 27:
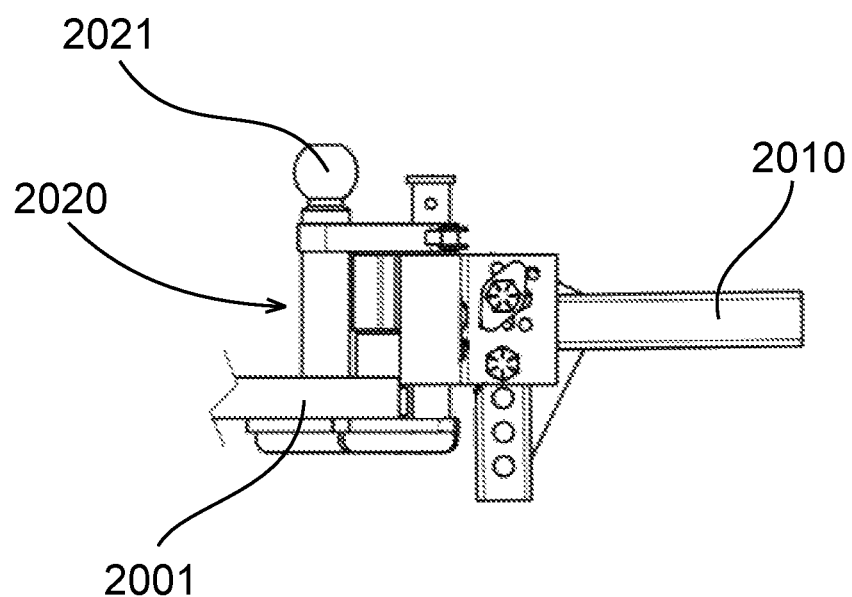
FIG. 27 is a side view of a portion of the embodiment of FIG. 23.

Now referring to FIGS. 21 and 22, two exemplary embodiments of trailers with weight distribution hitch systems with moment bar storage under the trailer are shown. This prevents the moment bars from extending outward and becoming an obstacle or hazard to persons walking around the trailer. In FIG. 21, the moment bars 1401 are stowed or docked under the trailer using brackets 1427. In FIG. 22, the moment bars 1501 telescope in and out of brackets or sockets 1528 and are preferably locked in place using pins or similar devices.

In various exemplary embodiments, the disclosed weight distribution system uses a kinematic linkage to reduce or even eliminate trailer sway. The kinematic linkage acts to move the effective pivot point of the trailer from the ball hitch to a point further forward on the tow vehicle (as if it were connected like a fifth wheel trailer hitch). The kinematic link between trailer and tow vehicle includes multiple points where one part of the system moves relative to other parts to create a range of motion not found in a basic link. The disclosed system provides a robust method of stable towing. In various exemplary embodiments, the system may include a hitch shank, hitch ball mount, load bars, and/or weight distribution brackets (for attachment to the trailer frame).

In various exemplary embodiments, the brackets attached to the trailer hold the load bars tightly in the left-to-right direction preventing "free play" in the system. This increases the effectiveness of the system in controlling sway by keeping the center of rotation from moving rearward. However, the brackets allow the load bars to move freely front to back. In preferred embodiments, the brackets use low friction pads (e.g., nylon or brass pads) to reduce the friction between the brackets and load bars. This helps to prevent noise and sticking.

Now referring to FIGS. 23-28, an exemplary embodiment of a weight distribution hitch and a kinematic linkage for towing a trailer is shown. A hitch shank 2010 is attached at a first end to the tow vehicle and extends rearwardly from the vehicle (not shown). A head unit 2020 is pivotally attached to a second end of the hitch shank 2010. A ball hitch 2021 is attached to the top of the head unit at a point that is not in vertical alignment with the pivotal connection to the hitch shank. In a preferred embodiment, neither the pivotal connection nor the ball hitch is aligned with the center of the head unit.

Figure 28:
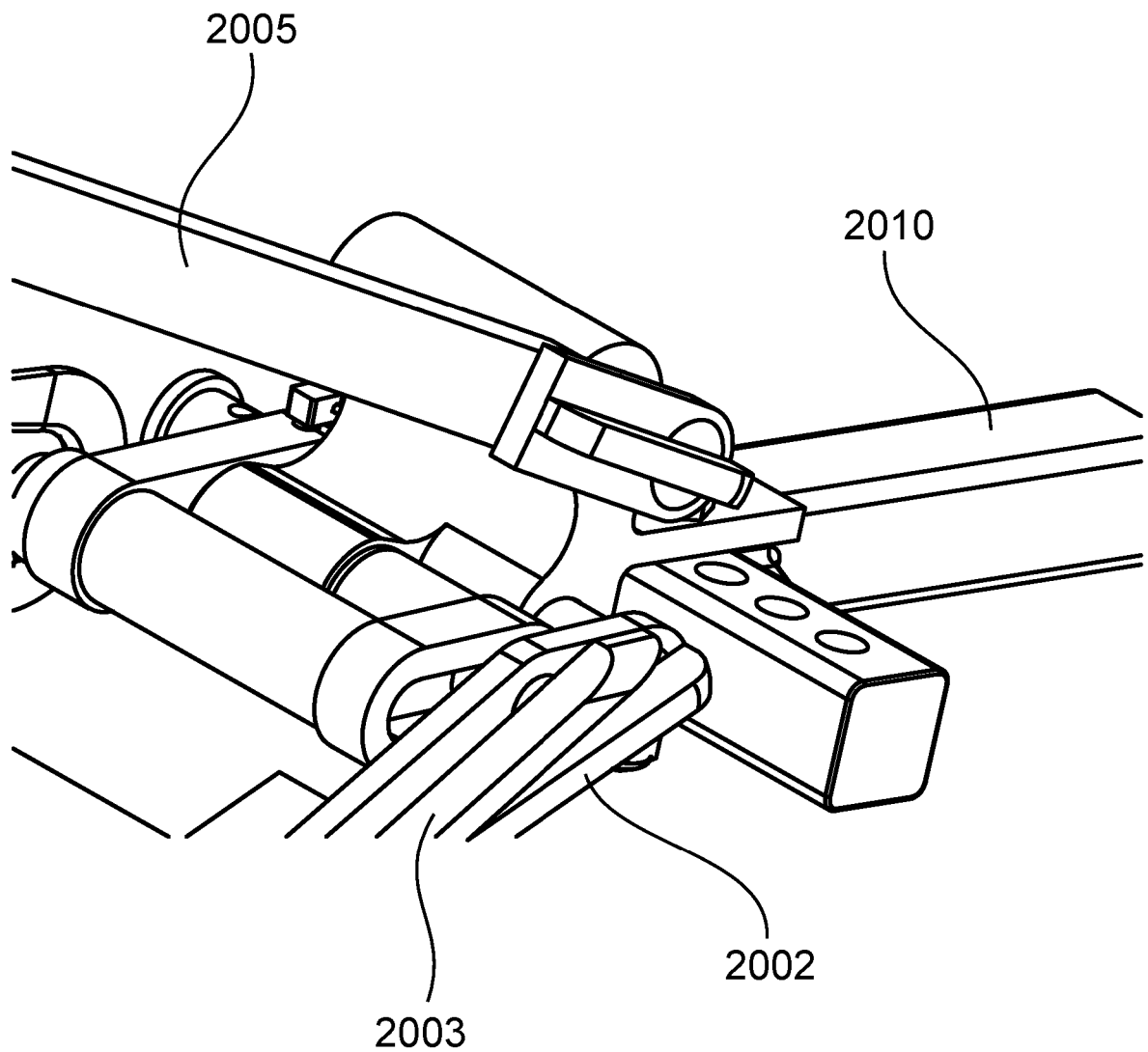
FIG. 28 is a bottom perspective view of the embodiment of FIG. 23.
Figure 29:
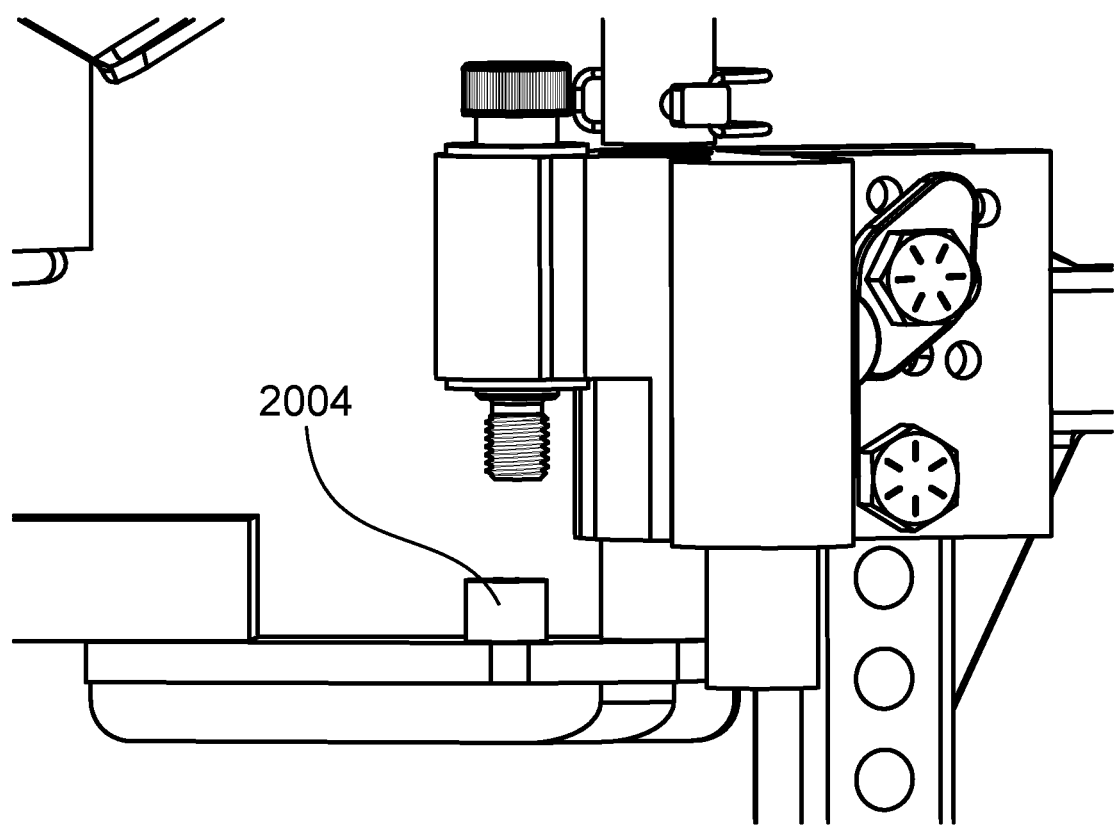
FIG. 29 is a side view of the embodiment of FIG. 23 with components removed to show the guide knob.

A first moment arm 2001 is connected to the bottom of the head unit at two points. As best shown in FIGS. 28 and 29, a first tine 2002 at a proximal end of the first moment arm is pivotally attached to the head unit. A second tine 2003 has a guide knob 2004 that extends upward into a slot 2022 on the head unit creating a sliding connection that also allows the angle between the slot 2022 and the second tine 2003 to change as they move. A second moment arm 2005 is also pivotally attached to the head unit 2020. In various exemplary embodiments, the angle between the first moment arm and the head unit is different from the angle between the second moment arm and the head unit when the trailer and vehicle are aligned. In preferred embodiments, the second moment arm is attached to an arm 2006 extending outward from the head unit.

The first moment arm 2001 and second moment arm 2002 are slidably attached to brackets 2007 attached to the trailer frame. In various exemplary embodiments, the brackets are adjustably attached to the frame vertically so that the moment arms exert a forward moment on the vehicle for weight distribution.

Figures 30A, 30B, 30C:
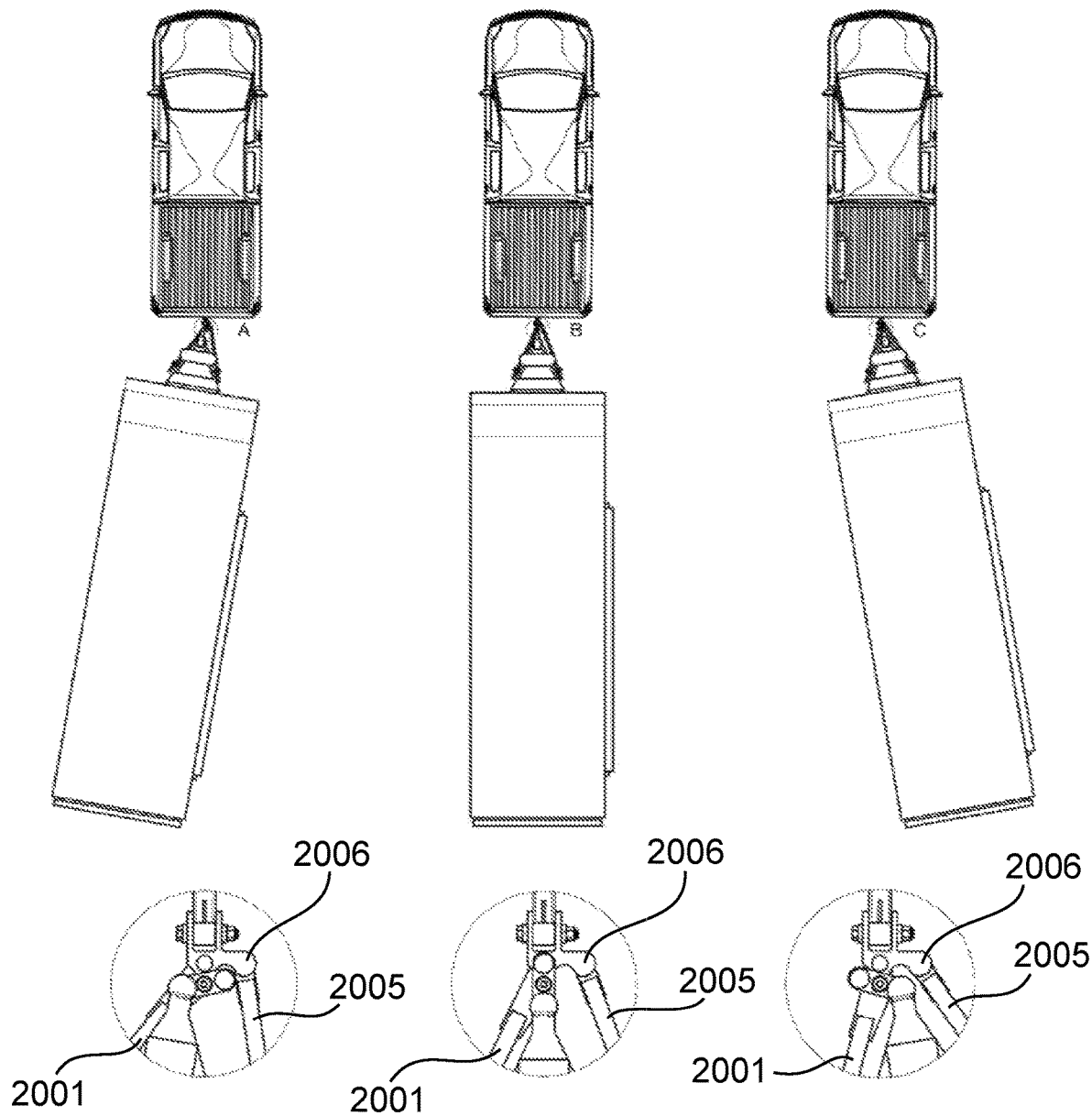
FIG. 30A is a top view of a trailer and tow vehicle at a 10° angle to the left from aligned straight.
FIG. 30B is a top view of a trailer and tow vehicle aligned straight.
FIG. 30C is a top view of a trailer and tow vehicle at a 10° angle to the right from aligned straight.

Referring now to FIGS. 30A-C, the interaction of the shaft and slot during left and right turns is illustrated. In FIG. 30A, the tow vehicle is making a slight left turn (10° from straight). The head unit has rotated around the first pivot point clockwise almost 90 degrees. In FIG. 30B, the tow vehicle has returned to straight. The first and second pivot points are now both in the centerline. In FIG. 30A, the tow vehicle is making a slight right turn (10° from straight). The head unit has rotated around the first pivot point counterclockwise almost 90 degrees.

In this embodiment, the effective point of rotation for the trailer is moved forward about 78 inches from the ball joint when the trailer is straight behind the tow vehicle. During sharp cornering, such as when turning in a campground or parking lot, the effective rotation point is moved back toward the hitch for easier maneuvering at low speeds. For example, when the trailer is one degree from straight, the effective pivot point is only 25 inches forward. When performing a turn at highway speeds, the effective pivot point is about 10.5 inches forward at an angle of about 2.5 degrees.

The system may also be used to prevent or reduce trailer porpoising, which is the up and down oscillation of a trailer and vehicle, in response, for example, to hitting a bump. This can be similar to a slinky rising and falling as it is held at each end. In various exemplary embodiments, the head unit 2020 is connected to the hitch shaft with a tilt mechanism that allows the head unit to pivot somewhat forward and backward when the trailer is towed over a rise or through a dip reducing the impact of uneven roads on the weight distribution system.

Figure 31:
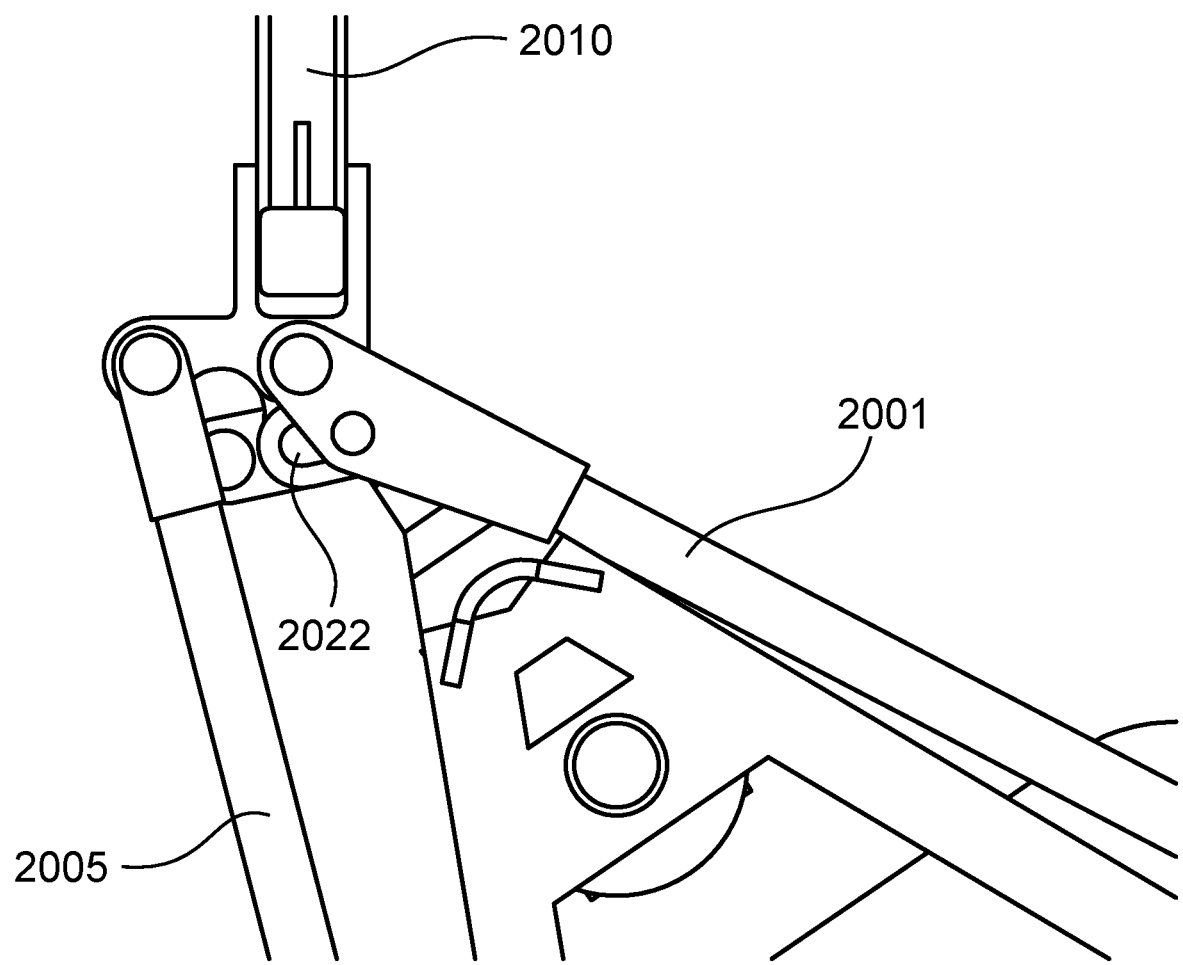
FIGS. 31-35 are bottom views of the embodiment of FIG. 23 in a variety of positions from left to right turns.
Figure 32:
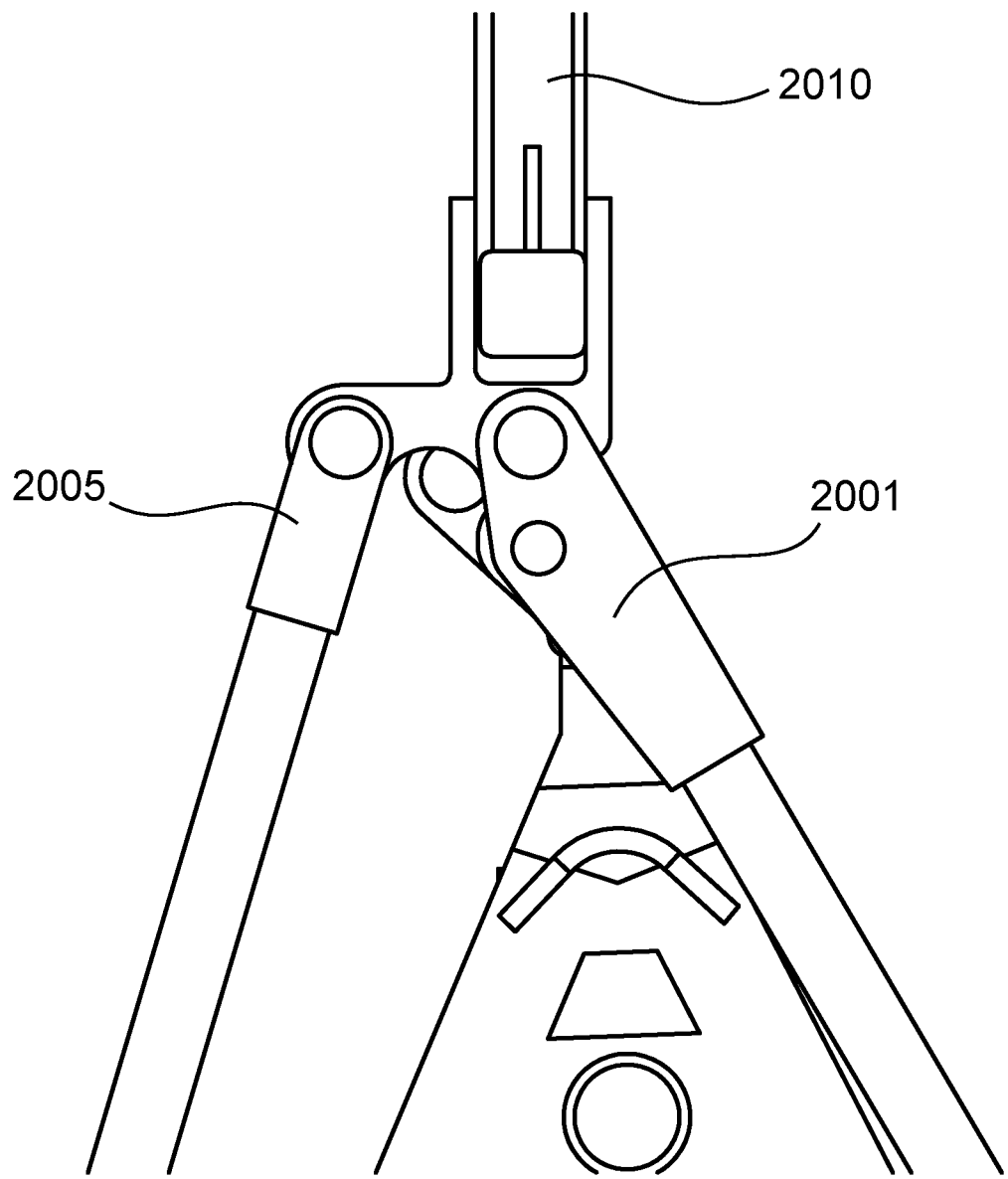
Figure 33:
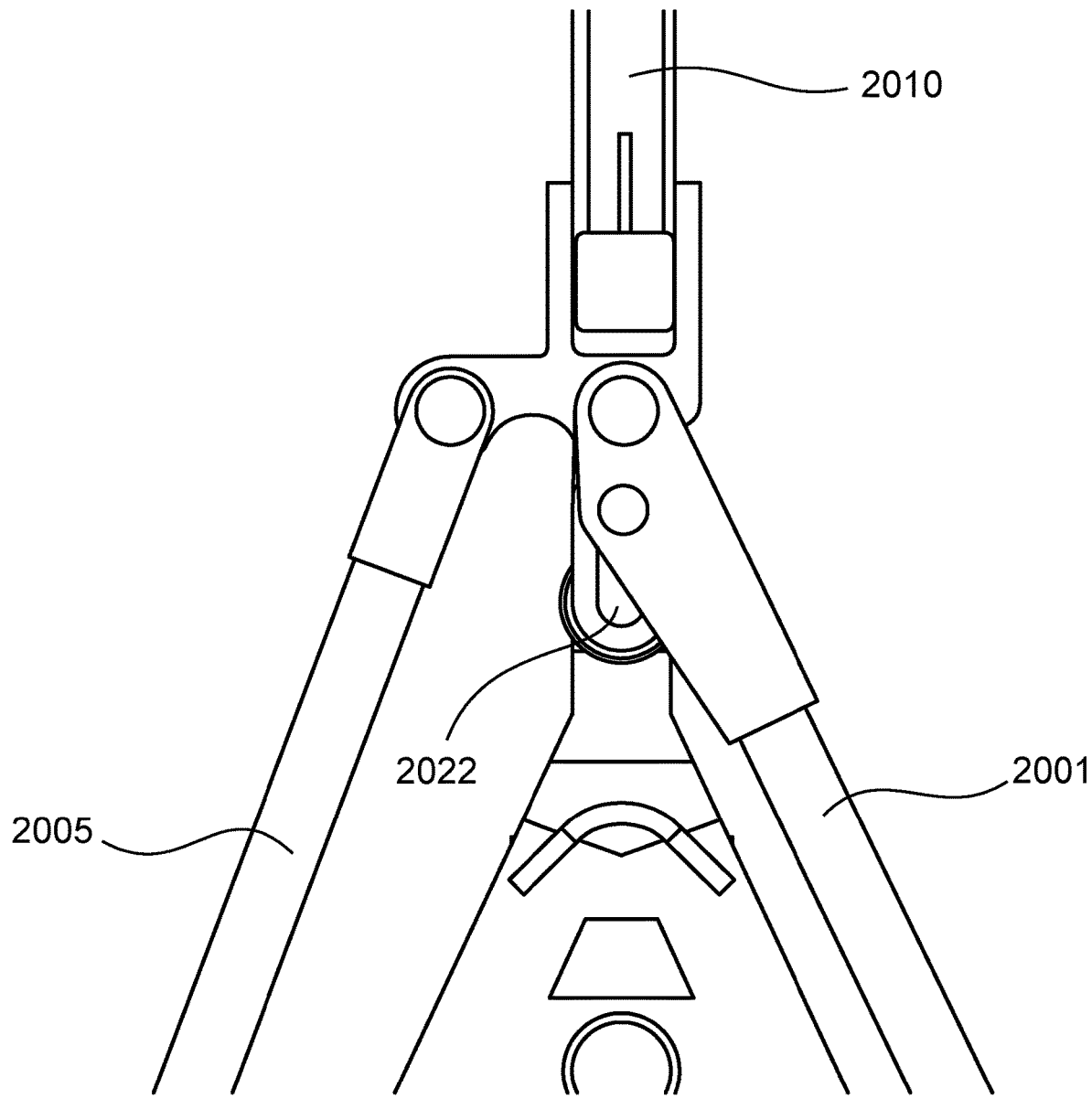
Figure 34:
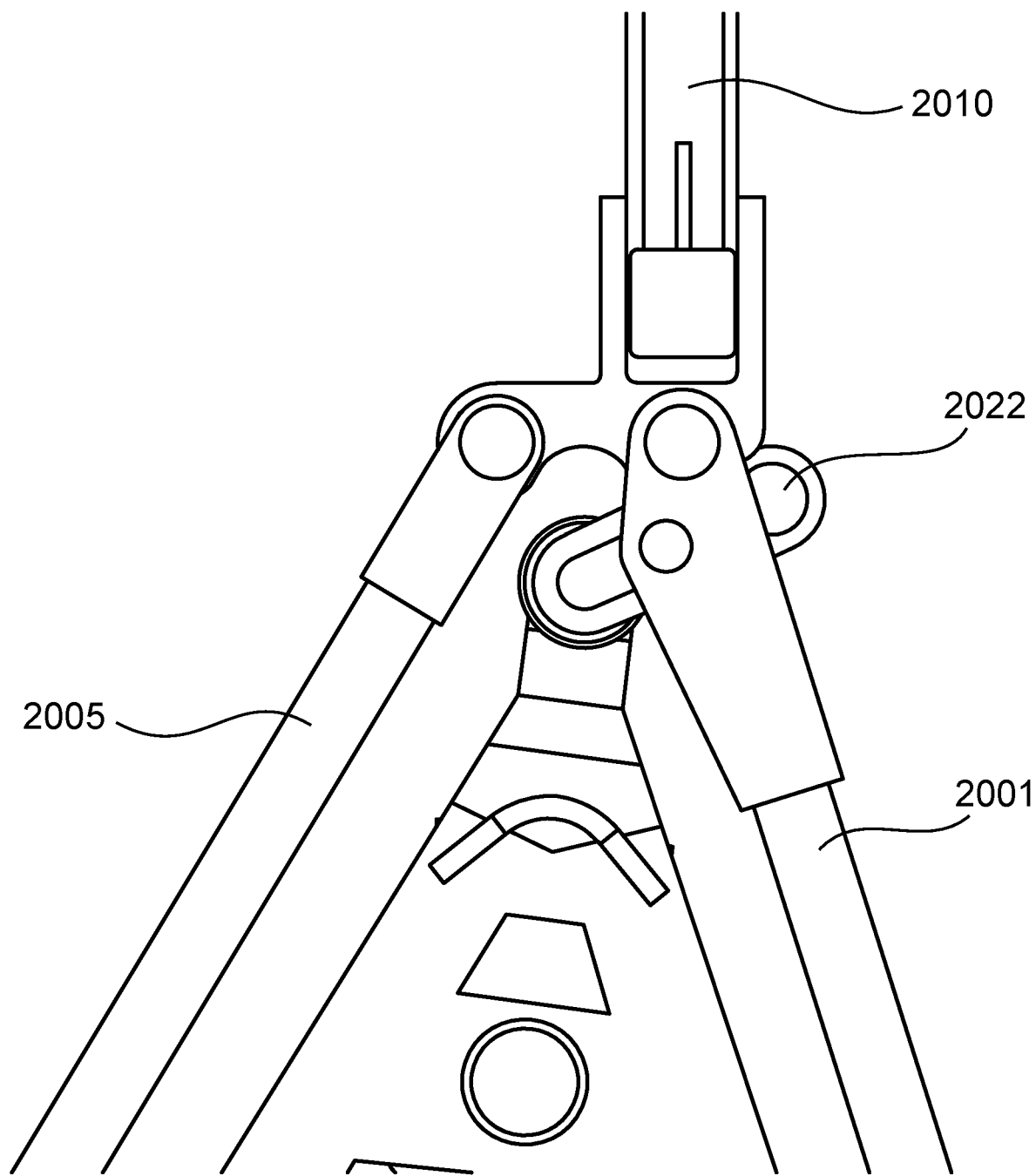
Figure 35:
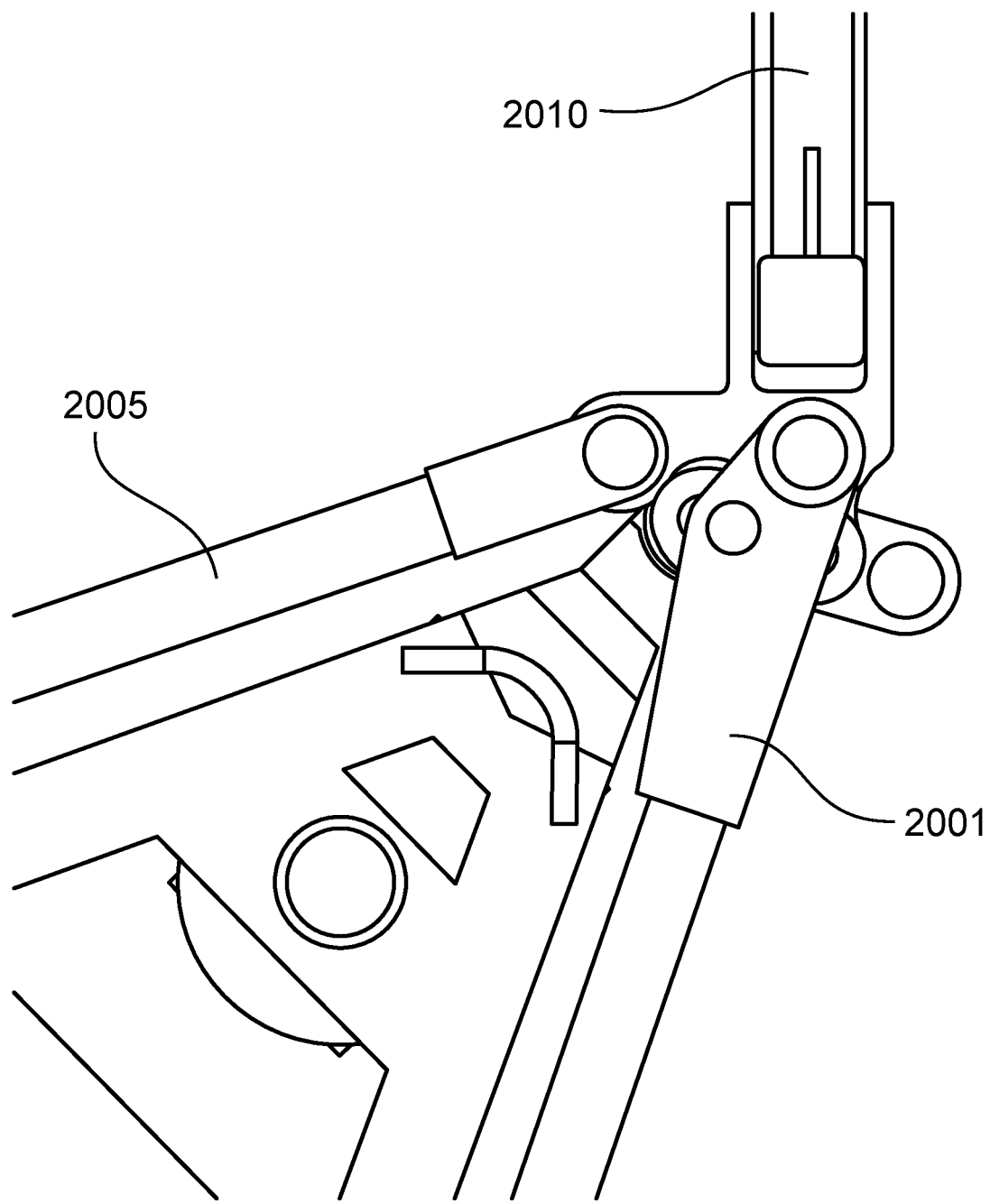

Referring to FIGS. 31 to 35, the system is shown from below at a variety of alignments from a left turn to straight to a right turn. FIG. 31 shows the system in a sharp left turn. FIG. 32 shows the system in a shallow left turn. FIG. 33 shows the system in a neutral or straight alignment. FIG. 34 shows the system in a shallow right turn. FIG. 35 shows the system in a sharp right turn.

In various exemplary embodiments, the system can be locked into place disabling the kinematic linkage system and used for conventional bumper towing (e.g., when towing a lighter load that does not require weight distribution on the hitch and/or). An embodiment with locking features may include a hitch shank, head unit, locking pin, ball (on rotating arm assembly), load bars, tilting hardware, and/or spring clips.

Figure 36A:
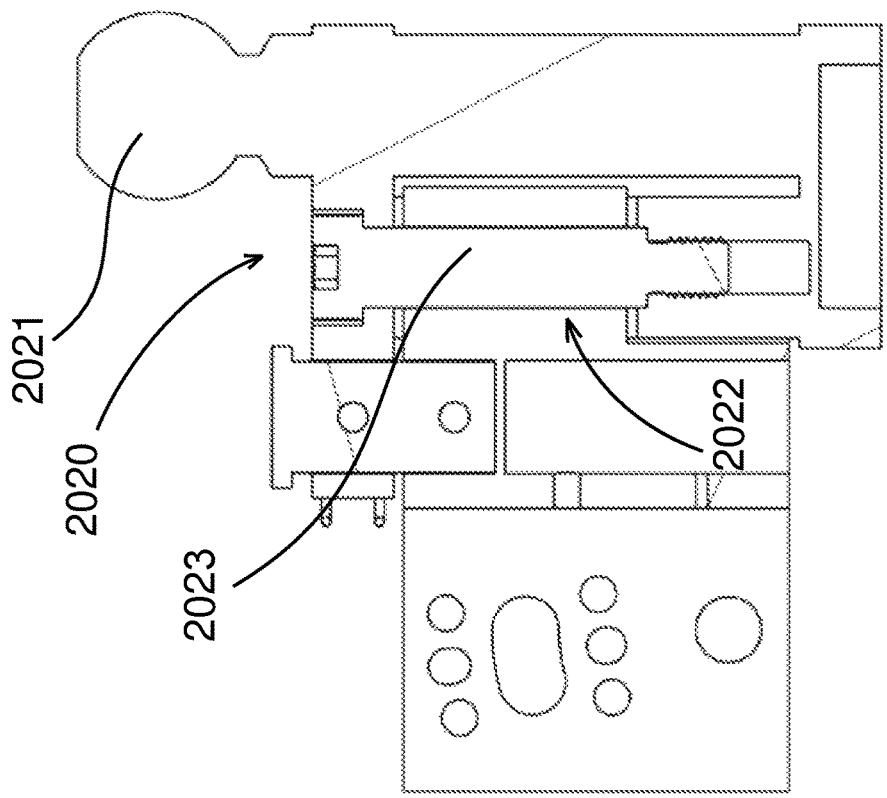
FIG. 36A is a cross-sectional side view of the embodiment of FIG. 36.
Figure 36:
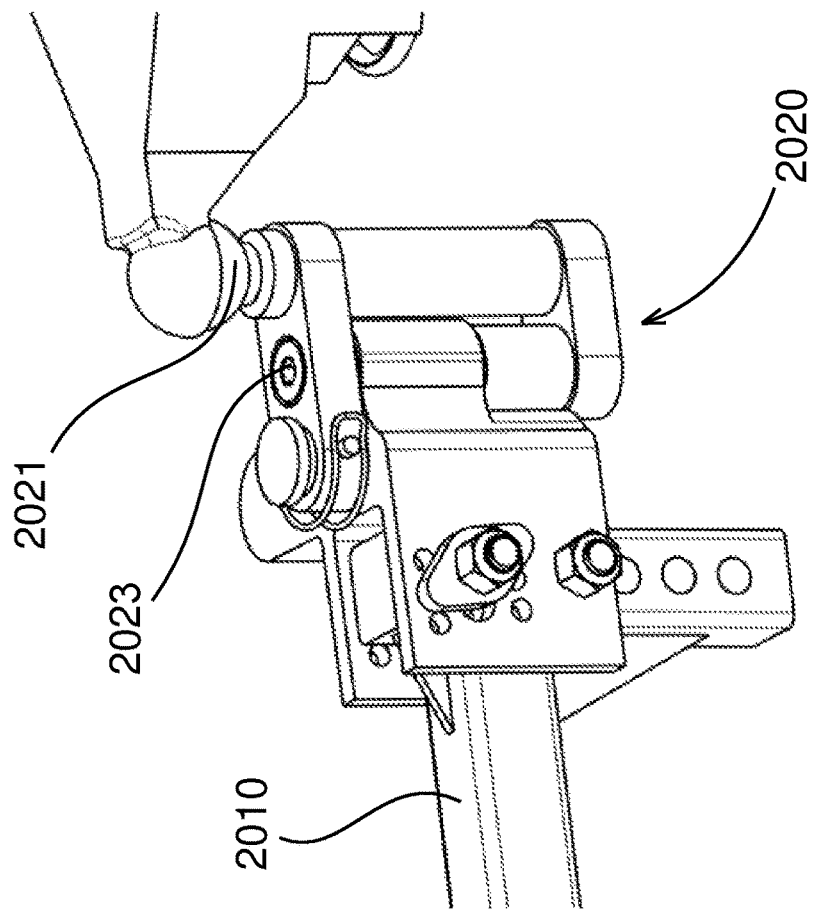
FIG. 36 is an isometric view of a second exemplary embodiment of a weight distribution hitch system with kinematic sway control according to the present disclosure.

Referring to FIGS. 36 and 36A, an exemplary embodiment of a hitch with a locking mechanism is shown. A locking pin 2023 is inserted through holes in the hitch shank 2010 and head unit 2020. This prevents rotation around the first pivot point converting the system into a basic hitch.

Figure 37:
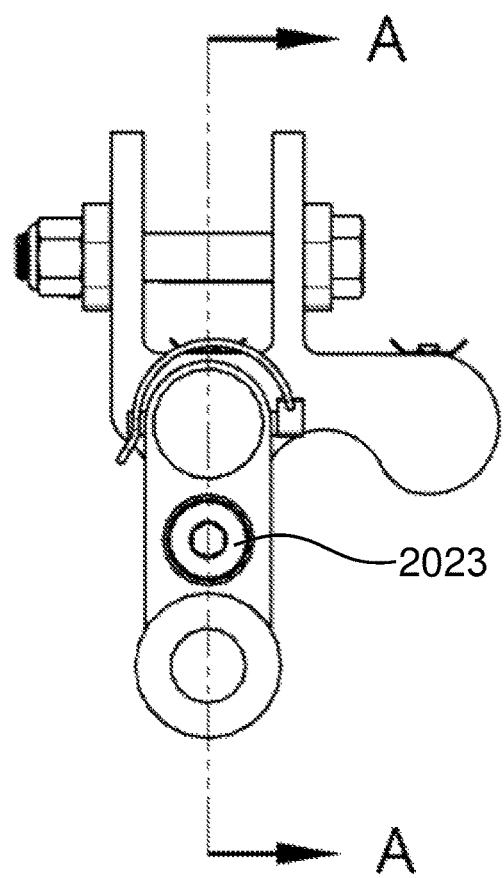
FIG. 37 is a top view of the embodiment of FIG. 36.
Figure 37A:
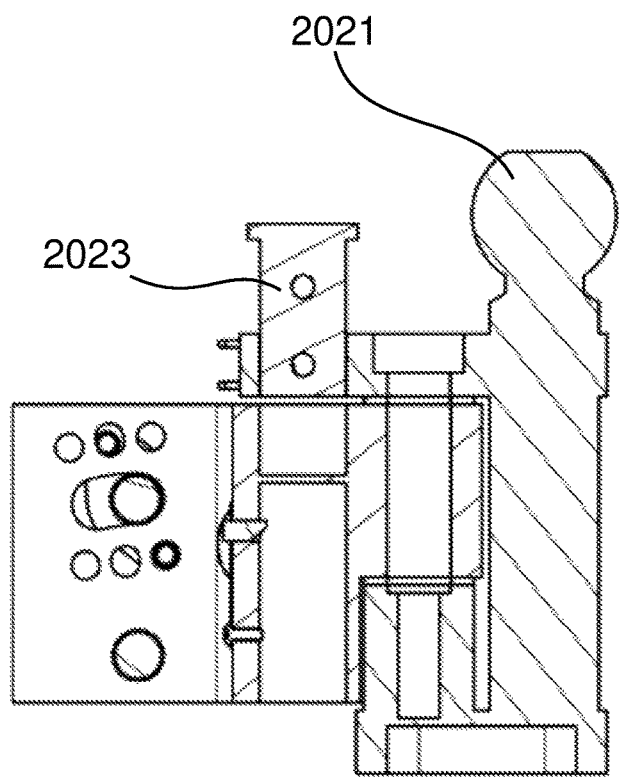
FIG. 37A is a side cross-sectional view of the embodiment of FIG. 36 taken along the line A-A in FIG. 37.

FIGS. 37 and 37A show the system with the pin 2023 partially retracted in the hole in the head unit but not in the hole in the hitch shank and held in place by a pin. This provides convenient storage for the locking pin when not being used to lock out rotation.

All patents, published patent applications, and other publications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A hitch system, comprising:
   a hitch shaft with a forward end configured to rigidly attach to a tow vehicle and a rearward end extending rearwardly toward a trailer frame;
   a head unit pivotally attached to the rearward end of the hitch shaft at a first pivot point having an upper portion and a lower portion, comprising:
   a hitch ball on the upper portion of the head unit positioned out of vertical alignment with the first pivot point creating a second pivot point between the hitch ball and a trailer attached thereto; and
   a slot on the lower portion of the head unit, the slot having portions in vertical alignment with the first pivot point and the second pivot point;
   a first moment arm with a distal end configured for slidable attachment to a first bracket on the trailer frame and a forked proximal end comprising:
   a first tine pivotally connected to the lower portion of the head unit; and
   a second tine having a knob in a sliding connection with the slot; and
   a second moment arm with a distal end configured for slidable attachment to a second bracket on the trailer frame and a proximal end pivotally attached to the head unit;
   wherein the first moment arm is at a first angle relative to the trailer and the second moment arm is at a second angle relative to the trailer;
   wherein the first angle is greater than the second angle; and
   whereby the effective pivot point of the system is moved forward to reduce sway.

2. The hitch system of claim 1, wherein the first tine is longer than the second tine.

3. The hitch system of claim 1, further comprising an arm extending laterally from the head unit wherein the second moment arm is pivotally attached to the arm at a distal end from the head unit.

4. The hitch system of claim 3, wherein the arm is approximately perpendicular to the longitudinal centerline of the tow vehicle.

5. The hitch system of claim 3, wherein the arm does not change position relative to the hitch shaft.

6. The hitch system of claim 3, wherein the arm is on the right side of the shaft hitch shaft.

7. The hitch system of claim 1, wherein the first bracket and second bracket further comprise a low friction surface in contact with the first moment arm and the second moment arm.

8. The hitch system of claim 1, wherein the slot extends past the first pivot point.

9. The hitch system of claim 1, wherein the slot extends past the second pivot point.

10. The hitch system of claim 1, wherein the first bracket and second bracket are adjustably attached to the frame and configured to bias the first moment arm and second bracket arm to exert a forward moment on the vehicle.

11. The hitch system of claim 1, wherein the first bracket and second bracket hold the first and second moment arms at a consistent distance from the longitudinal centerline of the trailer.

12. The hitch system of claim 1, wherein the first moment arm and second moment arm are on opposite sides of the vehicle or trailer longitudinal centerline.

13. The hitch system of claim 1, wherein the first further comprise a low friction pad in contact with the first moment bar and the second bracket further comprises a low friction pad in contact with the second moment bar.

14. The hitch system of claim 1, wherein the effective pivot point varies as the angle between the trailer and tow vehicle changes.

15. The hitch system of claim 8, wherein the effective pivot point is furthest forward from the hitch ball when the trailer and tow vehicle are aligned straight.

16. The hitch system of claim 8, wherein the effective pivot point is about 78 inches forward when the trailer and tow vehicle are aligned straight.

17. The hitch system of claim 8, wherein the effective pivot point is about 25 inches forward when the trailer and tow vehicle are turned 1 degree to either side.

18. The hitch system of claim 8, wherein the effective pivot point is about 10.5 inches forward when the trailer and tow vehicle are turned 2.5 degrees to either side.

19. The hitch system of claim 1, further comprising a pin hole in the head unit and a pinhole in the hitch shaft configured such that a locking pin may be inserted through both pinholes and prevent rotation around the first pivot point.

20. The hitch system of claim 19, wherein the locking pin may be placed in a first position that does not engage both the hitch shaft and the head unit and in a second position that engages both the hitch shaft and the head unit whereby rotation around the first pivot point is prevented.

\* \* \* \* \*